(12) United States Patent
Bank et al.

(10) Patent No.: US 7,577,687 B2
(45) Date of Patent: Aug. 18, 2009

(54) SYSTEMS AND METHODS FOR SYNCHRONIZING DATABASES

(75) Inventors: Marcel Bank, Oberrohrdorf (CH); Hansbeat Loacker, Egg (CH)

(73) Assignee: UBS AG, Zurich (CH)

( * ) Notice: Subject to any disclaimer, the term of this patent is extended or adjusted under 35 U.S.C. 154(b) by 371 days.

(21) Appl. No.: 11/392,681

(22) Filed: Mar. 30, 2006

(65) Prior Publication Data

US 2006/0222163 A1  Oct. 5, 2006

(30) Foreign Application Priority Data

Mar. 31, 2005  (EP) .................... 05007049

(51) Int. Cl.
*G06F 17/30* (2006.01)
(52) U.S. Cl. .............. 707/203; 707/202; 707/204; 370/241; 370/503; 709/208; 709/227; 709/248; 379/221.08
(58) Field of Classification Search .............. None
See application file for complete search history.

(56) References Cited

U.S. PATENT DOCUMENTS

| 5,933,837 | A  | * | 8/1999  | Kung ................... 707/201 |
| 6,223,187 | B1 | * | 4/2001  | Boothby et al. .......... 707/201 |
| 6,347,322 | B1 |   | 2/2002  | Bogantz et al. .......... 707/202 |
| 6,732,122 | B2 | * | 5/2004  | Zoltan .................. 707/201 |
| 6,779,002 | B1 |   | 8/2004  | Mwaura ................. 707/203 |
| 6,999,956 | B2 | * | 2/2006  | Mullins ................. 707/2 |
| 7,095,829 | B2 | * | 8/2006  | Claudatos et al. ........ 379/88.22 |
| 7,269,607 | B2 | * | 9/2007  | Cotner et al. ........... 707/200 |
| 7,296,036 | B2 | * | 11/2007 | Celik ................... 707/201 |
| 7,302,446 | B1 | * | 11/2007 | Boothby ................ 707/102 |
| 7,321,907 | B2 | * | 1/2008  | Tsuchida et al. ......... 707/204 |
| 2002/0073109 | A1 | * | 6/2002 | Toriumi ................ 707/204 |
| 2002/0120763 | A1 |   | 8/2002 | Miloushev et al. ........ 709/230 |
| 2002/0147737 | A1 | * | 10/2002 | Todokoro et al. ......... 707/200 |
| 2002/0165724 | A1 |   | 11/2002 | Blankesteijn ............ 705/1 |

(Continued)

OTHER PUBLICATIONS

Dominic J. Delmolino "Strategies and Techniques for Using Oracle7 Replication" Oracle Corp., 1995, XP002267343, Washington, DC, US.

(Continued)

*Primary Examiner*—Pierre M Vital
*Assistant Examiner*—Mohammad S Rostami
(74) *Attorney, Agent, or Firm*—Tarolli, Sundheim, Covell & Tummino LLP

(57) ABSTRACT

Computer-supported method for building and/or synchronising a second database from/with a first database, accesses by work units being carried out at least on the first database from at least one application workstation, to generate, change or delete contents of the database, with at least one first server to guide and maintain the first database, said server being connected to at least one application workstation, at least one second server to guide and maintain the second database, at least one data connection which connects the two servers, a software program component being provided by which, in the case of a transaction which is initiated from one application workstation on the first database, a sister transaction can be called up on the second database and vice versa—in which case, from the point of view of the application workstation, the sister transaction on the side of the second database behaves analogously to its counterpart on the side of the first database.

28 Claims, 9 Drawing Sheets

U.S. PATENT DOCUMENTS

| | | | |
|---|---|---|---|
| 2002/0199024 A1* | 12/2002 | Givoly et al. | 709/248 |
| 2003/0101223 A1* | 5/2003 | Pace et al. | 709/206 |
| 2003/0145021 A1* | 7/2003 | Parkkinen | 707/204 |
| 2003/0208505 A1* | 11/2003 | Mullins et al. | 707/102 |
| 2004/0024795 A1* | 2/2004 | Hind et al. | 707/204 |
| 2004/0083245 A1 | 4/2004 | Beeler, Jr. | 707/204 |
| 2004/0215670 A1* | 10/2004 | Holenstein et al. | 707/201 |
| 2005/0050115 A1* | 3/2005 | Kekre | 707/204 |
| 2005/0050116 A1* | 3/2005 | Gross et al. | 707/204 |
| 2005/0055386 A1* | 3/2005 | Tosey | 707/204 |
| 2005/0125459 A1* | 6/2005 | Sutinen et al. | 707/201 |
| 2005/0149468 A1* | 7/2005 | Abraham | 707/1 |
| 2005/0198085 A1* | 9/2005 | Blakey et al. | 707/204 |
| 2005/0246395 A1* | 11/2005 | Sevilla | 707/204 |
| 2006/0020643 A1* | 1/2006 | Locke et al. | 707/204 |
| 2006/0106881 A1* | 5/2006 | Leung et al. | 707/200 |
| 2006/0136519 A1* | 6/2006 | Batta et al. | 707/204 |
| 2007/0067356 A1* | 3/2007 | Mills et al. | 707/201 |
| 2007/0192288 A1* | 8/2007 | Brodersen et al. | 707/3 |

OTHER PUBLICATIONS

European Search Report dated Sep. 6, 2005.
Dominic J. Delmolino: Strategies and Techniques for Using Oracle 7 Replication Oracle Corp., 1995, XP002267343, Washington, DC, US.
International Search Report dated Oct. 4, 2006.

* cited by examiner

SYSTEMS AND METHODS FOR SYNCHRONIZING DATABASES

FIELD OF THE INVENTION

This invention is related to databases, and more particularly to systems and methods for synchronizing databases.

BACKGROUND OF THE INVENTION

This invention concerns a computer network system and procedures for building and/or synchronising a second database from/with a first database. In particular, the invention concerns those computer network systems in which a first, already existing database is to be transferred into a second database which is to be newly constructed. In complex systems with one or more front end stations/applications and a back end, migrations traditionally take place in such a way that first the front end is migrated and only then the back end. In practice, simultaneous migration of both the front end and the back end is often not indicated, for various reasons (high complexity, long down time of system). Above all in the case of large DP projects in which a single-step migration (so-called "big bang") from an existing database platform to the new database platform is ruled out, for a wide variety of reasons—e.g. because not all applications for access to the new database are yet completed, because for security reasons a full changeover to the new database is not yet indicated, because the operational behaviour of the new database still has to be investigated in detail, or similar—there is a need for a systematic approach which allows a controlled, gradual changeover from the existing database to the new database.

Furthermore, there is often the operational requirement to have the two databases in the practically consistent state at certain defined points in time, for instance at the end of the day. In other words, the data should be continuously kept synchronised on both database systems, and users should also be able to maintain the data, for instance using application software programs.

Since even after the initial transmission of the data from the first database to the second database (initial load), because of the continued maintenance of the first database, a very large number of changes of the data held in it can occur in a short time, approaches which are efficient regarding computing time and transfer cost (required communication bandwidth, incurred costs) are required. The demand on the system also increases if the changes are maintained online in the first database and are to be made available also in the second database as closely as possible in time (at least approximately in real time). In some cases, for collective or group changes, offline maintenance—at times of low operation—is also required and must be made possible.

Since the migration from the first database platform to the second database platform is generally carried out, as well as for application reasons (enterprise flow optimisation, enterprise restructuring, etc.) mostly from technical or IT points of view (faster access, more complex query options, change of hardware system platform, etc.), there are mostly considerable differences regarding the physical implementation, structures and organisational forms between the first and second databases. This aspect is particularly intensified if between the first and second databases there are structurally considerable differences regarding system architecture (hardware, operating system, database design and database implementation). In this case, changes which are to be made in the first database (=changes, deletions of existing entries, creating and filling new entries) cannot be mapped in the same way, i.e. not identically (1:1) in the second database. Also, changes are often complex, that is they affect a first plurality of entries in the first database, but because of the different structures and organisational forms a different plurality of entries in the second database, or entering changes in different and/or additional fields in the second database. This circumstance too excludes immediate maintenance of the changes in the second database in the identical way as it takes place in the first database.

Finally, it must be taken into account that in the case of large DP projects, usually multiple computer program applications access and change the databases. This circumstance—particularly in the case of online systems which are quasi-concurrent regarding accesses—has considerable influence on the strategy for keeping the second database up to date.

Because of transit times of messages/data flows in the networks in which the two databases are included and/or by which the two database platforms are connected to each other, and other influences (file length, priorities, etc.) in real time or online environments or even mixed (real time and batch processing systems), it is not directly possible to ensure that the changes are made available to the application software programs which access the second database in exactly the same sequence as they are executed in the first database. In other words, when data is transferred from one database to the other database, it can be overtaken by data which was transmitted earlier. This has the unwanted consequence that an "older" change can reset the data of a "newer" change to the "old" value. Also, because of these effects, the problem can occur that records are not yet completely maintained in the second database, so that incompletely changed, and thus in the end false, data is made available to the application software programs which access the second database.

Not least, efforts must be made so that the quality, operability, performance etc. of the original database is not considerably—ideally not at all—limited by the migration process.

SUMMARY OF THE INVENTION

The invention has the object of providing a computer network system which efficiently makes it possible to synchronise two database platforms, while avoiding the disadvantages and problems of previous approaches, as explained above.

To achieve this object, the invention provides a computer network system with the features of Claim 1.

According to the invention, at least one software program component by which, in the case of a transaction which is initiated from one application workstation on the first database, a sister transaction can be called up on the second database, and vice versa—in which case, from the point of view of the application workstation, the sister transaction on the side of the second database behaves analogously to its counterpart on the side of the first database—can also be provided.

The approach, according to the invention, of the sister transactions has the advantage, in association with the coexistence of the first and second databases, that both for clients and for decentralised applications the migration of the database platforms (of the back end) is transparent, i.e. invisible. This approach also allows testing of the new components of the second database platform, e.g. by comparing the database contents of both sides. Inconsistencies indicate errors on the side of the second database. A further advantage is that the migration can be done step by step (e.g. one branch after the other).

The aim and purpose of porting transactions from the first database platform into the context of the second database platform as so-called sister transactions is that the functions, services and data which exist at the first database platform should be made available as quickly as possible in the context of the second database platform. According to the invention, the same source programs are used (so-called single source concept). This makes it possible, during the migration phase, to maintain (and modify if necessary) only one source code, i.e. that of the first database platform. When the sister transactions are activated in the context of the second database platform, the interfaces of/to the application software program(s) are not changed. The applications are therefore unaffected by this porting and activation.

Additionally, through the porting/migration of the data of the first database and its functions to the second database platform, replacement of the first database by multiple software program components is considerably simplified, since any technical problems of cross-system replacement can be corrected.

A sister transaction consists of one or more software program modules. A software program module is, for instance, a Cobol program, which contains the processing logic instructions and accesses the system via primitives. A primitive in turn consists of a macro, which for instance is written in the Delta computer language, and a program module, which for instance is written in the Cobol computer language. The macro makes available, in the second database environment, the same interface as in the first database environment, but accesses new Cobol modules in the background. The Cobol module uses the infrastructure of the second database components to ensure that processing takes place in the new environment according to the old function.

A sister transaction which is ported into the second database environment is therefore based on the same Cobol program code as the "original" transaction in the first database environment. In other words, a sister transaction in the second database environment is an identical duplicate of the appropriate transaction in the first database environment, with the—essential—difference that the system environment is simulated on the second database side.

This, in association with the above-described porting of the application software programs and transaction programs (for instance) in the Cobol programming language, makes it possible to continue to carry out maintenance work on the software in the context of the first database, and then to transfer code updates—even automatedly—into the context of the second database.

Since the interfaces of the sister transactions in the second database environment correspond precisely to the original transactions in the first database environment, it is possible to configure precisely whether and how the original transactions in the first database environment or the sister transactions in the second database environment should be used. As long as the first database environment is the master, all changes of the data stock are carried out via the original transactions in the first database environment. However, some read-only sister transactions can optionally already be activated on the side of the second database environment. During this time, record-oriented and functional synchronisation takes place between the second database environment and the first database environment. For functional synchronisation, before the time at which the second database functions as master, some modifying or writing sister transactions can be used. For this purpose, the same message which has already been processed in the context of the first database is transmitted. However, it is no longer necessary to revalidate the input on the side of the sister transactions.

The changes which are carried out in real time (online) on the side of the first database already use the encapsulation module of the first database. This encapsulation module makes it possible to synchronise all changed records from the first database into the second database (record synchronisation). On the side of the second database, the records are sent to the main coexistence controller, which tracks the coexistence element programs and the corresponding application program elements (software components) in the context of the second database platform. The encapsulation module is ported once and then adapted to the environment of the second database. In this way, changes to the database contents can be sent via the main coexistence controller to the coexistence element programs and the corresponding application program elements (software components), in the context of the second database platform.

Modifying sister transactions use the same mechanism as record synchronisation, to write to the second database and the corresponding application program elements (software components) in the context of the second database platform.

After all sister transactions are available with the second database environment, this can be defined as master. From this time, all real time (but also batch processing) changes take place via the sister transactions, which trigger the synchronisation to the first database after a successful change of the second database. This synchronisation takes place in this phase exclusively functionally, i.e. all incoming messages or transactions are passed on unchanged to the first database and tracked there. As soon as this phase is concluded, the sister transactions can be replaced.

However, the sister transactions can also be used for functional synchronisation of the first database to the second database, since in this way the same data and functions are available on both sides. As explained above, even for any reverse synchronisation from the second to the first database all messages can thus be used identically to keep the two systems synchronous.

The approach, according to the invention, of the sister transactions has the advantage, in association with the coexistence of the first and second databases, that both for clients and for decentralised applications the migration of the database platforms (of the back end) is transparent, i.e. invisible. This approach also allows testing of the new components of the second database platform, e.g. by comparing the database contents of both sides. Inconsistencies indicate errors on the side of the second database. A further advantage is that the migration can be done step by step (e.g. one branch after the other).

In summary, it must be stated that the approach of the sister transactions can be used to ensure the functional synchronisation of the two databases. Sister transactions are also used to maintain the second database as master, identically to the first database and without effects in the real time interfaces. Sister transactions can be used to make the construction of individual software program components step by step possible. They are used as backup if some software program components are not yet available as master in the environment of the second database.

Accesses by work units are carried out at least on the first database from at least one application workstation, to generate, change or delete contents of the database, with at least one first server to guide and maintain the first database, said server being connected to at least one application workstation, at least one second server to guide and maintain the second database, at least one data connection which connects the two servers, the accesses by the work units to the first database taking place by means of an encapsulation module, which is set up and programmed so that the work units are passed to it, work units which it accepts are decomposed into one or more messages, the messages are entered in the first database, and the messages are sent to the second database.

This approach offers a series of unexpected advantages during the migration (phase) and also in operation:

The data traffic, regarding both the volume and the time requirement, is less than with other approaches, in which, for instance, the application software programs write directly to both databases during the migration phase. The cost of adapting the application software programs is also less. Finally, the cost of searching for errors in the databases and/or application software programs is clearer, since there is a clear assignment, according to which only the encapsulation module can access the first database to write or change, and converts/decomposes work units, according to defined rules, into messages, which are then sent to the second database.

Additionally, the encapsulation module is set up and programmed to test whether it is more efficient to send the original work unit, as it accesses the first database, unchanged regarding content (but if necessary decomposed or divided into the individual messages) to the second database, or to send the changed entries resulting from the work unit (if necessary decomposed or divided into the individual messages) from the first database to the second database. Depending on the result of this test, the corresponding content can then be sent. All accesses which change the first database take place exclusively through the encapsulation module. Therefore, the application software programs and also other (e.g. utility) programs do not access the first database directly. Instead, they direct their change commands which are intended for the first database to the encapsulation module, which co-ordinates and executes the actual accesses to the first database. Additionally, the encapsulation module sends the changes (in a way which is described in detail below) to the second database. This ensures that no change of the first database is "lost" for the second database. This procedure has the effect that the two database platforms agree.

This approach according to the invention additionally allows the coexistence of and interaction between two application worlds, i.e. two different complex DP system environments, each of which is based on its own database core (i.e. the first and second databases). During the coexistence and migration phase, decentralised workstations from both application worlds and the application software programs which run on them can, without problems, fetch their required data from one of the two databases in real time, process it and if required write changed data back (at least to the first database). It is even possible that it does not become evident to a user of the databases that he or she is communicating with two databases. In other words, the user does not notice at all that two databases exist, since even the contents which are offered to him or her on the user interface can access one or both of the databases alternatively or directedly, without it being detectable for the user, in the individual case, to which database the access takes place. This allows a creeping changeover, which the user does not notice at all, from one database to the other. The first database can be a hierarchical database, the data of which is migrated to a relational (second) database, or an object-oriented (second) database. It is equally possible that the first database is a relational database, the data of which is migrated to an object-oriented (second) database.

Since only one of the two databases, i.e. the first, is accessed externally by the application software programs to make changes, whereas the second is tracked according to the changes of the first database, the two databases have practically identical contents, at least at specified key times (e.g. the end of the day).

During the migration phase, only forward synchronisation from the first (master) database to the second (slave) database is required, since all application software programs access only the first database (through the encapsulation module) to change it. With the encapsulation module, the aim that each changing access to the first database is also carried out in another place is pursued. This place can be either a message list (for real time transmission) or a batch transport file (for processing in batch mode).

By decomposing the work units (these can be complex transactions which are initiated by an application software program, i.e. commands for changes of the database, referring to facts which the application software program processes) into one or more individual or themselves encapsulated messages, it is possible to take account of the database structures on both sides, which may be different. In this way information content is not lost when the work units are processed and/or the changes are maintained in both databases. Additionally—depending on the structure of the first database in relation to the second database—more efficient access is possible, requiring less communication bandwidth and computer/memory resources.

"Themselves encapsulated messages" are understood to be data which belongs together logically or from the process flow. This data can be structured hierarchically:

| | |
|---|---|
| header part 1 | (e.g. create new customer) |
| M packets (1 – m) | (surname, forename, account manager, etc.) |
| header part 2 | (e.g. create new customer's address) |
| N packets (1 – n) | (street, city, country, etc.) |
| header part 3 | (e.g. create additional data) |
| O packets (1 – o) | (hobby, birthday, etc.) |
| Term 3 | |
| P packets | |
| Term 2 | |
| Q packets | |
| Term 1 | |

It is also possible to generate or use, in the second database, organisational structures or criteria (search or sort criteria) which are new or different from those in the first database. This too simplifies the operation of the second database, and improves the efficiency of accesses to it, while simultaneously the operation of the first database, based on practically the identical data, is possible.

A further advantage of the approach according to the invention is that the migration can be carried out gradually (i.e. in steps), since application software programs which until now have accessed the first database only need a new data handover protocol (interface) to access the second database. Thus the migration can be carried out in succession, undetectably for the user of the application software programs. The user interface which is visible to the user of the application software programs can remain unchanged.

A specially suitable area for using the approach according to this invention is master data, i.e. customer data, partner data, product data, process data or similar, in contrast to transaction data, i.e. account movements, orders, deliveries, production process data, etc.

In a preferred embodiment of the invention, the encapsulation module is set up and programmed to provide the messages with a first identifier which identifies each message, before it is sent by the encapsulation module to the second database. In this case, the encapsulation module is set up and programmed to fetch the first identifier from a preferably central unit, which forms the first identifier as a time stamp or serial number. This ensures that the individual messages can be processed in the correct sequence and associated (with a work unit) in the correct way.

The encapsulation module sends an identifier with every change or message which is relevant to the second database. This identifier, usually a time stamp, is tracked with every change of the second database, if the origin of the change is in the first database.

Each message contains the content, which is to be changed or generated, of the first database, and/or the changed or generated content of the first database, and is stored in the first and/or second database. Each message which the encapsulation module generates has a technical header part, an application header part and the content part (old and new) together. The content part (old and new) consists of a character sequence comprising up to several kilobytes. The content depends on the type of encapsulation, the updating type (Store, Modify, Delete) and the transmitted content type.

In other words, the message contains a code for the action to be carried out, the content, which is to be changed or generated, of the first database, and/or the changed or generated content of the first database, depending on the action to be carried out.

The message structures are filled by the encapsulation module as follows, and preferably apply likewise in batch mode:

| Update type | Application header part | Content-old | Content-new |
|---|---|---|---|
| Store (S) | X | x! | |
| Modify (M) | X | X | X |
| Delete (D) | X | X | |

The data is provided in a way which ensures that as few as possible "empty" data items or initialised structures must be forwarded via the infrastructure physically in the message. This is relevant to data security.

With all three update types "Store", "Modify" and "Delete", the header part and content-old are filled. In the case of "Modify", the data before the change is in content-old and the data after the change is in content-new. In the case of "Delete", content-old is filled with the last data before the physical deletion. In the case of the "Delete" update type, only content-old is filled, whereas in the case of the "Store" update type, only content-new is filled.

Description of Interface:

| Name | Content |
|---|---|
| COEX-MUTPRG | program name of change program |
| COEX-AGENTC | agency code |
| COEX-APCDE | application code |
| COEX-NL | processing branch |
| COEX-UFCC-E | program function code |
| COEX-UPTYP | update type<br>S = STORE<br>M = MODIFY<br>D = DELETE (ERASE) |
| COEX-USERID | USERID of responsible person |
| COEX-PAKET-TIME-STAMP | date and time (YYYYMMDDhhmmssuuuuuu) of message |
| COEX-REC-TIME-STAMP | date and time (YYYYMMDDhhmmssuuuuuu) of change |
| COEX-NL-KD | branch |
| COEX-KDST | customer code number |
| COEX-OBJID | object identification/DB1 key fields |
| COEX-RECTYP | record type (record type from DB1 or TERM, TERM records do not include data part) |
| COEX-REC-SEQUENCE | record sequence number (within packet, in case of TERM = highest sequence number per packet) |
| COEX-ORIGIN | origin of record<br>0 = initial load<br>1 = redelivery (from DB1)<br>2 = synchronisation<br>3 = reconciliation<br>4 = functional (DB1)<br>5 = online sister (DB2) |
| COEX-REQUEST-TYPE | O = online processing<br>B = batch processing |
| COEX-RESYNC-ID | primary key from TAPCONLINEPACKAGE (or TAPCONLINEDATA) or from TAPCBATCHPACKAGE (or TAPCBATCHDATA) for redelivery |
| COEX-RESYNC-STATUS | contains return code of DB1 redelivery function |
| COEX-RESERVED | reserved |
| COEX-DATA | record, old and new |

The COEX-RECTYP field in the header part describes what data type is included in content-old and content-new. In the case of functional encapsulation, which is explained below, this attribute contains a special transaction code; likewise the so-called Term message.

Each message therefore includes, among other things, the following identification data: message time stamp (identifies the database 1 transaction) and sequence number (defines the correct processing sequence within the transaction). It is understood that not all the parameters which are listed in the above table are absolutely required for implementation of the invention.

As previously mentioned, the encapsulation module is set up and programmed to store the number of messages into which a work unit is decomposed, and a first identifier, in a Term message, which the encapsulation module then sends to the second database. This ensures that all messages belonging to one work unit are not processed in relation to the second database until they have all been sent together to the second database—and have also arrived there. This effectively prevents older data concerning a database field "overtaking" newer data concerning the same database field because of batch processing processes which have been initiated in parallel or closely in time, because of different transit times in the DP network caused by different file lengths, etc., so that finally a false entry would be made in the second database. In the same way, data items which have functional dependencies on each other are prevented from being processed or entered in the second database in the incorrect sequence, so that their so-called referential integrity is retained. In this way, the sequence of mutually independent updates on the side of the second database is taken into account.

Additionally, the encapsulation module is set up and programmed to put the messages to be sent and the Term message into an output wait queue, from which they can be sent to an input wait queue of a controller of the second database.

At least as far as sending the data from the first database in the manner described above is concerned, the approach according to the invention provides, on the side of the second database, the controller, which is preferably set up and programmed to read the messages which are sent to it from the input wait queue, to check whether all the messages belonging to one work unit have arrived in the input wait queue, to carry out the appropriate changes in the second database when all the messages belonging to one work unit have arrived in the input wait queue, and if required to distribute the corresponding changes or the messages which contain them and belong to one work unit, depending on specified conditions, at least partly to other database or application programs.

In other words, the input wait queue behaves like a storage tank, into which the messages belonging to one work unit are added as individual parts, and the controller only begins changing the second database with the content of the messages when all messages belonging to the work unit have been received. This ensures that when the second database is changed, incoming-contents are not overrun by each other and thus wrongly changed. Particularly in the case of changes which trigger consequential changes, this is a mechanism which avoids wrong changes.

The header part of each message is forwarded to the second database or its controller preferably unchanged, as it arrives in the controller of the second database, and likewise the data part old/new. Between the header part and the data part, a part which is specific to the second database can be inserted. This can be a single attribute, i.e. a (for instance 16-digit) code, which is specific to the second database, of the relevant database entry. Depending on the message type, this can be an account ID, a business contact ID or an address ID, etc. It is important that the controller forwards the same interface, i.e. the identical information in the identical format, to all coexistence program elements which it affects in the individual case.

For (partially) automated maintenance of the managed data, so-called batch processing programs are available in the first database. These batch processing programs are managed (monitored and controlled) independently of the real time maintenance of the first database. Batch processing programs are mainly used to process large quantities of data. Among other things, these programs prepare files for third parties, produce lists and carry out internal processes such as mass changes for all accounts with object type xyz.

Since these mass changes must also access the first database via the encapsulation module, the invention provides, similarly to the individual access by application software programs, that according to the invention the encapsulation module is preferably set up and programmed, depending on reaching a predefined parameter, to decompose work units coming from a batch processing run into corresponding messages and to write them to a transfer database, so that after the predefined parameter is reached, the content of the transfer database is transmitted to the second database.

Finally, there is also an intermediate solution between the mass changes which are carried out as a batch processing run and the individual changes, which are usually carried out by application software programs. In this intermediate solution, an application software program which multiply changes the first database is called up via a macro routine. In this way, it is possible to carry out a relatively small number (e.g. of the order of magnitude of 100) of changes in the manner of a batch processing run, via an application software program from a workstation, without having an actual batch processing run set up and processed.

The encapsulation module is also set up and programmed, depending on reaching a predefined parameter, to decompose work units coming from a batch processing run into corresponding messages and to write them to a transfer database. A monitor software module, which is set up and programmed, after the predefined parameter is reached, to transmit the content of the transfer database to the second database, is also provided. For this purpose, the monitor software module initiates the sending of the content of the transfer database to the second database after the predefined parameter is reached. The predefined parameter can be a predefined time (e.g. every 10-30 min, or a specified time of day, e.g. at night when there is little data traffic), a predefined quantity of data, or similar.

The content of the transfer database is then preferably transmitted to the second database as one or more closed batch transport file(s). Groups of messages which belong together can always be entered in a closed batch transport file and not distributed to two separate batch transport files. The sequence of the individual batch transport files can be recognised because they have an appropriate code. For this purpose, each of the batch transport files has a file header, from which it can be seen in what context, on what command requirement, on what date, at what time of day, etc. the batch transport file was created. Additionally, in the case of errors the monitor can send specified batch transport files again on request.

In a similar way to how, on the side of the first database, all accesses to the first database are prevented or carried out by the encapsulation module, on the side of the second database its controller preferably according to the invention ensures that the second database is changed exclusively in a way which the controller controls. Therefore, preferably batch transport files containing the content of the transfer database are also transmitted to the controller of the second database for further processing.

The controller of the second database preferably has, for each database or application program which receives data from the first database, a coexistence element program module, which is set up and programmed to synchronise this data for the relevant database or application program specifically, and to carry out changes corresponding to the messages belonging to one work unit in the input wait queue in the second database or application program, or in the database which is associated with the relevant application program. In relation to this, for the sake of a uniform interface design, the second database must be handled in the same way as a database or application program which receives data from the first database. The only essential difference is that the second database is updated before all other database or application programs.

For the controller of the second database and/or of the other database or application programs, the information about which of the coexistence element programs is to be supplied with which contents is preferably held in tables. For this purpose, for each database or application program for which a coexistence element program module exists, a row, in which the database or application program is identified by name, is held in a two-dimensional table. New database or application programs can thus easily be added. For each change or message, i.e. for each attribute of the database, there is a column. In these columns, three different values can be entered: {0, 1, 2}. "0" means that the corresponding database or application program does not require this attribute or cannot process it; "1" means that the corresponding database or application program can process this attribute, but is only supplied with it if its value has changed; and "2" means that the corresponding database or application program can process this attribute, and is supplied with it in any case.

In a second, three-dimensional table, preferably "message type", "database or application program" and "attribute of database" are held. For each message type, according to the invention there is a preferably two-dimensional sub-table. For each database or application program for which there is a coexistence element program module, a column can be held in the two-dimensional sub-table. The database or application program is identified by its name. New database or application programs can thus easily be added. For each attribute, there can be a row in the two-dimensional sub-table. Two different values can be entered here: {0, 1}. "0" means that the database or application program is not affected by this attribute of the message. "1" means that the database or application program is affected by this attribute of the message. The invention also includes the option of exchanging rows and columns in the tables.

It is also within the scope of this invention to hold and maintain this information for the controller of the second database or of the other database or application programs, instead of in tables, in chained, possibly multidimensionally organised data object structures.

According to the invention, the controller of the second database is also set up and programmed so that the messages belonging to one work unit can be transmitted to the appropriate coexistence element program modules, by which these messages are processed further. The appropriate coexistence element program modules are preferably set up and programmed to set an OK flag in a table after successful further processing by an appropriate coexistence element program, and/or to enter a NOK flag (not OK flag) together with the name of the appropriate coexistence element program in an error processing table, so that they are available for display and/or reprocessing or error correction.

According to the invention, it is provided that the reprocessing or error correction of messages which have not been successfully further processed by coexistence element programs preferably takes place either by the messages which have not been successfully further processed by coexistence element programs being sent again by the controller of the second database to the appropriate coexistence element program for renewed further processing, by redelivery of the messages which have not been successfully further processed by coexistence element programs from the first database—by the controller of the second database—to the appropriate coexistence element program for renewed further processing, or by deletion of the messages which have not been successfully further processed by coexistence element programs from the second database.

According to the invention, a message packet preferably contains 1 to n messages of a transaction which was applied to the first database. A message can be relevant to multiple coexistence program elements. All messages of one transaction of the first database (so-called packets) can also be processed in one transaction in the context of the second database. Redelivery makes it possible to redeliver all messages of a packet of the first database to the second database. Such packets can be identified as intended for redelivery. A periodic batch processing run can select all identified packets, write the messages to be redelivered to a file and transmit it to the first database. In the first database, the file can be read and the corresponding messages can be transmitted via the synchronisation infrastructure to the second database. In the context of the second database, the redelivered packet can be processed and the identified and redelivered packet can be given the error status "Redelivered".

According to the invention, the repeat function makes it possible to process a packet—which could not be successfully processed through the controller—again by a coexistence program element. There is a use for this function in the case of sequence and/or infrastructure problems.

According to the invention, the termination function makes it possible to set the error status of a packet to the "Done" error status. Packets for each one of the coexistence program elements can be set to "Done".

According to the invention, reprocessing or error correction makes it possible to link the input data (both the data which is provided in real time and the data which is provided by batch processing) of the controller of the second database to error events which are logged in an error database, and to store them in an error report database. The data of the reprocessing or error correction is integrated in the database of the controller of the second database. If the messages from a transaction from the first into the second database cannot be applied in the latter, they preferably remain in the database of the controller of the second database, where they are processed by reprocessing or error correction.

When error events are recorded, the message at which the error event occurred is preferably stored as the primary key. It is thus possible, in the error analysis, to assign the error event entries to this message. This is necessary because or if the error event entries do not refer to a message, but to a packet in the reprocessing or error correction.

According to the invention, so that the error analysis does not take an excessive amount of time, in the case of an error the external application software programs write error messages which are as differentiated and meaningful as possible into the error event entries. This simplifies the error search in the programs.

According to the invention, two acknowledgments to the controller are available to the coexistence element programs. Depending on which acknowledgments are passed back, the controller of the second database behaves differently.

| Error | Supporting functions |
|---|---|
| 1. Error detection | differentiated recognition of possible error states interface to error recording function, which records the error |
| 2. Error recording | Error recording function Record error event. Store incoming message which cannot be processed; the linkage of the message which cannot be processed to all associated error entries is ensured. |
| 3. Error analysis | Display error overview Display list of all incoming messages of error table. Set filter according to error status, date and time from, date and time to, branch, customer code no., object ID, message type, change program. Display detail of errored change Display incoming message and/or its content. Generated error messages Display all error entries belonging to an incoming message. Call up repeat function Call up redelivery |
| 4. Error correction | Repeat function The repeat function makes it possible to process a packet which the controller of the second database could not process successfully again. Redelivery Redelivery makes it possible to redeliver a packet which the controller of the second database could not process successfully from the first database. Termination The termination function makes it possible to set a packet which the controller of the second database could not process successfully manually to the "Done" error status. |

In the case of sequence problems, reprocessing or error correction makes the repeat function available. If a coexistence element program identifies a sequence problem, it can cause, through the acknowledgment, an automatic attempt to repeat. The acknowledgment, its permitted values and their meaning are described below.

According to the invention, the software program components which are used in the environment of the second database use, in the case of all "Warning" and "Exception" error events, the error report database, to enter errors and pass on the operational monitoring. The following table describes how the error events are classified.

| Status | Acknowledgment | Description |
|---|---|---|
| OK | 00 | Successful processing. Error processing/ reprocessing was not involved. |
| Warning | 04 | Processing was carried out, but should be checked again. |
| Exception | 08 | The desired processing could not be carried out and was terminated. All resources were reset to the original |

-continued

| Status | Acknowledgment | Description |
|---|---|---|
| | | state. In the case of input validation, several errors can be logged before termination of processing. |
| Forced termination (exception) | 12 | This status is provided for batch file processing. If it occurs, the whole processing should be terminated (program stop). |

To achieve adaptability of the encapsulation module to different requirements, it is set up and programmed to control its functions by reference data. The reference data can control the encapsulation module so that the first database is changed, and/or one or more messages are sent to the second database.

In a preferred embodiment of the invention, the encapsulation module is set up and programmed to send messages to the second database depending on logical switches, which are preferably controlled externally and/or by a program.

The encapsulation module provides the functions so that the online or batch processing changes which an application software program initiates in the context of the first database can be sent to the second database. The functions of the encapsulation module are controlled by reference data tables. The reference data controls whether a message is to be sent to the second database. The tracking of the second database is controlled according to the invention by two (or more) switches. For instance, the first switch defines, for each business unit, whether the second database is to be tracked or not. The second switch controls, for each application software program, whether the change which it initiates is to be tracked in the second database. The second database is therefore tracked only if both switches are "on", i.e. if the second database is to be tracked for this business unit (1st switch) and if the current application software program contains an entry that the second database is to be tracked (2nd switch). By these functions, precise controlled migration of the database platform is ensured.

"Functional encapsulation" is here understood to mean transmitting all changes of individual attributes to the first and/or second database. This makes it possible to forward all changes, in a controlled manner and at lower transmission cost, to other software program components. These software program components then carry out the function (Modify, Delete, Insert) in the second database environment. The changed entries resulting from the application of the work unit to the first database are sent by means of individual functions from the first database to the second database. Alternatively, the changed entries resulting from the application of the work unit to the first database are sent by means of individual messages from the first database to the second database. In the case of the last-mentioned record-based synchronisation or encapsulation, if changes of the first database occur, all changed records (=database entries) are synchronised from the first to the second database. In the case of functional synchronisation or encapsulation, if changes of the first database occur, all changed records are not synchronised from the first to the second database, but also the original message which was sent to the transaction is forwarded. The same also applies to synchronisation from the second database back to the first database.

The approach according to the invention ensures that the duration of the different end of day processings (or final processings at other times) does not change so much that the dependent processing cannot be concluded within the provided period. The tracking of the online changes with the approach according to the invention is successfully concluded within a few seconds in the second database. For tracking the batch processing changes in the second database, a few tens of minutes (20-40 min.) are enough.

Through the invention, it is possible to ensure that every change which is intended for the first database is detected by the encapsulation module and sent to the second database, in which case

- the change is in no way falsified during the transport to the second database,
- the change also arrives in the second database,
- the change is applied in the second database in the correct sequence,
- if processing ends abnormally on the second database, it is possible to restart, or error processing takes place; introduction controlled by processing units is possible; data consistency is ensured, and
- unforeseeable inconsistencies between the two databases (e.g. application error) can be corrected by reconciliation.

Particularly for searching for errors and understanding processes, it is advantageous if a proof of change for changes which are carried out in the first database and/or the second database is recorded, preferably in the appropriate database or in a work database. A classic case for this is the change of domicile of a customer.

The essential reason for the use of functional encapsulation is that the number of changed records is unforeseeable, and in the case of individual changes can result in a considerable number of consequential changes. As soon as a transaction puts down a relatively large number (approximately of the order of magnitude of 100 or more) of change calls, the performance of the whole system deteriorates considerably. This means that the response times extend to several seconds, and therefore the transaction is terminated because of a timeout. If the infrastructure of the first database can process not more than 20-30 persistent messages per second, tracking redundant data by a transaction causes such a timeout.

Functional dependency exists as soon as the change of a specified attribute of the first database triggers an unspecified number of changes of other attributes of the first database.

The first database is master as long as changes take place first in it and only afterwards in the second database. During this time, the second database is managed as the slave of the first database.

The second database is master as soon as the changes take place first on it and only afterwards in the first database if required. From this time, the first database can be managed as the slave of the second database, if and to the extent that this is required. To be able to carry out this step, all sister transactions must be present. Also, application software programs are no longer allowed to access the first database to write, in either real time or batch processing operation.

Software program components can be master as soon as all changes which are relevant in the context of the second database are carried out first in the software program components and only afterwards tracked in the second and if required in the first database. In this case, both the second database and the first database are managed as slaves. To achieve this state, all data of the second and first databases must be present in the software program components and also be managed by these software program components.

The maintenance of the first database can only be ended when no application software programs in the environment of the first database require more data from it.

Depending on the origin of the change—from the context of the first or from the context of the second—the two synchronisation directions are distinguished. The origin of the change thus defines whether the first or the second database is master for a specific transaction and a specified processing unit or branch. During the migration, it is possible that for one transaction the first database is master for certain processing units, and simultaneously the second database for other processing units.

In the case of synchronisation in the direction from the first to the second database, the synchronisation is either record-oriented or functional. The transactions were divided into three categories. This makes it possible to prioritise the application software programs to be ported.

A first type of transactions triggers record-oriented (i.e. database-entry-oriented) synchronisation. These transactions must be used in particular if only a few entries in the first database are affected by such a change.

A second type of transactions triggers functional synchronisation. These transactions must be used in particular if a relatively large number of entries in the first database are affected by such a change.

In the case of record-oriented synchronisation, the encapsulation module transmits all entries which are changed by a transaction of the first database to the main coexistence controller. The main coexistence controller first calls up the coexistence utility program(s) of the coexistence element of the second database environment, to bring the entries and/or the changes of the first database into the second database environment. After a successful change of the second database entries, the main coexistence controller calls up the coexistence element(s) and/or the coexistence utility programs of the application software programs (e.g. Partners), which contain the adaptation rules (mapping logic) from the first to the second database and/or to the application software programs in the second database environment.

In this case, the sister transactions of the first database environment are not required to bring the data successfully into the second database environment.

In the case of functional synchronisation, it is not those entries of the first database which are changed by one or more transactions which are transmitted in real time to the main coexistence controller via the encapsulation module and the synchronisation infrastructure, but the original input message which was sent to the transaction(s) of the first database. The main coexistence controller recognises, because of the message identifier, that an input message and not a record message is involved, and forwards the processing directly to that one of the sister transactions of the first database which carries out the same processing. When the encapsulation module of the first database is also ported, all changes of the second database can also be done via the sister encapsulation module of the first database. This sister encapsulation module sends the change as a record message to the main coexistence controller, which as in the case of record synchronisation calls up the coexistence elements and/or the coexistence utility programs of the application software programs (e.g. Partners), which contain the adaptation rules (mapping logic) from the first to the second database and/or to the application software programs in the second database environment.

In this case, the sister transactions are used to bring the data in the correct format (e.g. as dependent records) into the second database, and to trigger the synchronisation to the application software programs. However, online validation is not carried out in the context of the second database, because the content has already been validated in the context of the first database. Validation of the content in the context of the second database is activated only when the second database is master.

This also makes functional (reverse) synchronisation from the second to the first database possible later. In the case of this synchronisation direction, synchronisation takes place exclusively functionally from the second to the first database, although the changes in the context of the second database and/or from the second database to the application software programs "downstream" from them continue to take place in record-oriented form.

Since the transactions on both sides (of the first and second database platforms) are identical, all changes take place exclusively via a sister encapsulation module in the first database context. The encapsulation module modifies the second database synchronously using database macros. The encapsulation module then sends the same records also to the main coexistence controller as are sent to the coexistence elements and/or the coexistence utility programs of the application software programs (e.g. Partners) in the case of record synchronisation, so that they can be synchronised.

The approach of this invention now advantageously provides, differently from the conventional approach, a migration which begins at the back end. This has the advantage that on the side of the front end, i.e. of the application work stations, GUIs, user software, etc. nothing (or only a little) has to be changed, so that the migration does not affect the user.

Through the functional encapsulation according to the invention, the logic which is included in the subsequent processing taking account of the new database architecture and data structures of the second database is implemented identically or at least as similarly as possible to how it was in the first database. This is done according to the invention preferably by using sister transactions. The main coexistence controller can obtain the change message(s) either online or as a batch file. Because of the special record type or message type, this can detect that a message because of functional encapsulation is involved. The main controller can then call up a root program and hand over the message. The root program in turn can call up the corresponding sister transaction. The sister transaction, in co-operation with the migrated and adapted encapsulation program, can now create the records old/new (messages with database entries old/new and/or change tasks) of the first database as the main controller normally receives them from the first database. These records can then be put into the output wait queue, and the main controller can then process them as if they had come from the first database. Only in the header part, a special code is set (COEX ORIGIN), so that it is possible to detect from where a record comes. This is important for error analysis.

The invention also provides for carrying out a comparison between the first and second databases, to obtain a statement about the equality of the information content of the two databases. Starting from the data comparison, according to the invention a report (error log file) about the errored and/or missing records is produced. Finally, a function to correct the errored and/or missing records is also provided.

For this purpose, according to the invention a data container with a control table and a data table is provided. It is used to simulate the transaction bracket in the context of the first database in the context of the second database. Errored records from the data comparison are also written to this container.

This error detection and processing is a sub-function of the synchronisation between the two databases. It is based on the infrastructure of the error log file and data container. During the synchronisation, all messages are written to the data container and processed from there. If an error occurs during synchronisation, the data is identified as such. A link from the data container to the error log file is then created and the errors are then displayed/shown.

For this purpose, according to the invention the software program components error log file, data container, error processing during synchronisation, redelivery and data equalisation are combined into one logical unit. The GUIs which allow consolidated reporting of the synchronisation, initial load and data equalisation components are made available to the user(s). The option of manually initiating a redelivery for data correction because of an entry is also provided.

The repeat function can be provided, to carry out an immediate correction of an identified difference between the first and second databases. Another function, the redelivery function, includes a set of functions to select an errored or missing record in the context of the second database in a table, to generate a corresponding change and to propagate it via the synchronisation process back into the context of the second database. The redelivery function corrects three possible errors:

A record is absent from the first database, but present in the second database.
A record is present in the first database, but absent from the second database.
A record is present in the first database, but present in the second database with the wrong contents.

The data comparison system compares the data stocks of the two databases with each other and discovers as many differences as possible. If the data structures on the two systems are almost identical, a comparison can easily be carried out. An essential problem is the very large quantities of data which must be compared with each other at a specified key point (in time).

The data comparison system has essentially three components: error detection, error analysis and error correction.

Error detection includes, on the one hand, withdrawing and processing the data from the two databases. For this purpose, hash values are calculated and compared with each other. If there are differences, the data is fetched from the appropriate databases. Another part of error detection is a comparison program, which compares the corrupted data from the first and second databases in detail and documents differences in the error log file of synchronisation (and the data for it in the data container). In the data container, there is then an immediate attempt to apply the new data to the corresponding database by carrying out the repeat function.

Error analysis includes processing functions of error processing, to analyse the data from the error log file and data container and to link them to each other. This data is then displayed by a GUI (Graphical User Interface). The analysis of what error is involved can then be carried out manually if necessary. Also from this GUI, so-called batch redelivery functions and a repeat function (retry) can be initiated.

In the case of error correction, there are 3 versions:
A redelivery of individual records and/or the repeat function (retry). Error correction writes the errored data to the data container, from which the correction functions are initiated.
A partial initial load or mass update is identical to initial load.
In the case of an initial load, the affected tables are first deleted.

In the context of error correction, the following data structures among others are read and written:
data container
error logs unload files
hash files
conversion file
comparison file
redelivery file
Q1 database For the unload files, the same data structures as those of the initial load-unload files are used.

The coexistence controller program defines the programs or program components which are called up for a specified record type. The coexistence controller program is required to load the data to be corrected from the first database into the context of the second database.

In the case of successful redeliveries, the coexistence controller program sets the errored entries in the data container to "done".

The error messages and the errored data can be displayed (sorted if required). Functions are provided to initiate the redelivery services.

In the data container, the errors which are derived from the reconciliation of the second database can be distinguished from those which are derived from the synchronisation between the two databases. Additionally, functions for display, correction and redelivery or retry of the data are provided.

Through the function according to the invention, the quantities and error types are reduced the longer the systems of the two database environments are operated in parallel. Reconciliation can be done after the end of processing (day, week or similar) and according to record type. It is also possible to check only the records which are already required (interrogated) on the side of the second database. The records which are not yet used can be checked only once per month, for instance.

Reconciliation discovers inequalities between the systems of the two databases and corrects them. In this way, in the first place errors which have not already been discovered by synchronisation are detected. These can be:

non-encapsulation of a batch/online program on the system of the first database
messages and/or files lost on the transport path
program errors in the environment of the second database system
restoration on one of the two systems
message records which cannot be applied in the context of the second database It must be assumed that most errors can be corrected by the redelivery function. Alternatively, it is also possible through a further initial load or partial initial load (mass update) to reload the second database.

From the database entries to be compared and their attributes, in a first step the hash values are determined and compared with each other. If they are different, in a second step the original data items are compared with each other. For this purpose, first the hash values, and in a second step the original data items if required, are sent by the encapsulation module to the second database and compared there.

The present invention can be implemented on a network system that includes two or more computers. Each computer can include, for example, memory and a processing unit. The memory can be implemented, for example, as random access memory (RAM), and the processing unit can be implemented as one or more computer processors that accesses memory and executes computer executable instructions. Additionally, the present invention can include a coexistence controller implemented on a computer of the network system. The coexistence controller can be implemented as hardware (e.g., a server), computer executable instructions (e.g., software) that is stored in a computer readable medium and executed by a processing unit. The computer readable medium can be implemented as a memory (volatile or non-volatile), but cannot be implemented as pure energy (e.g. a carrier wave).

DETAILED DESCRIPTION OF THE DRAWINGS

Figure 1:
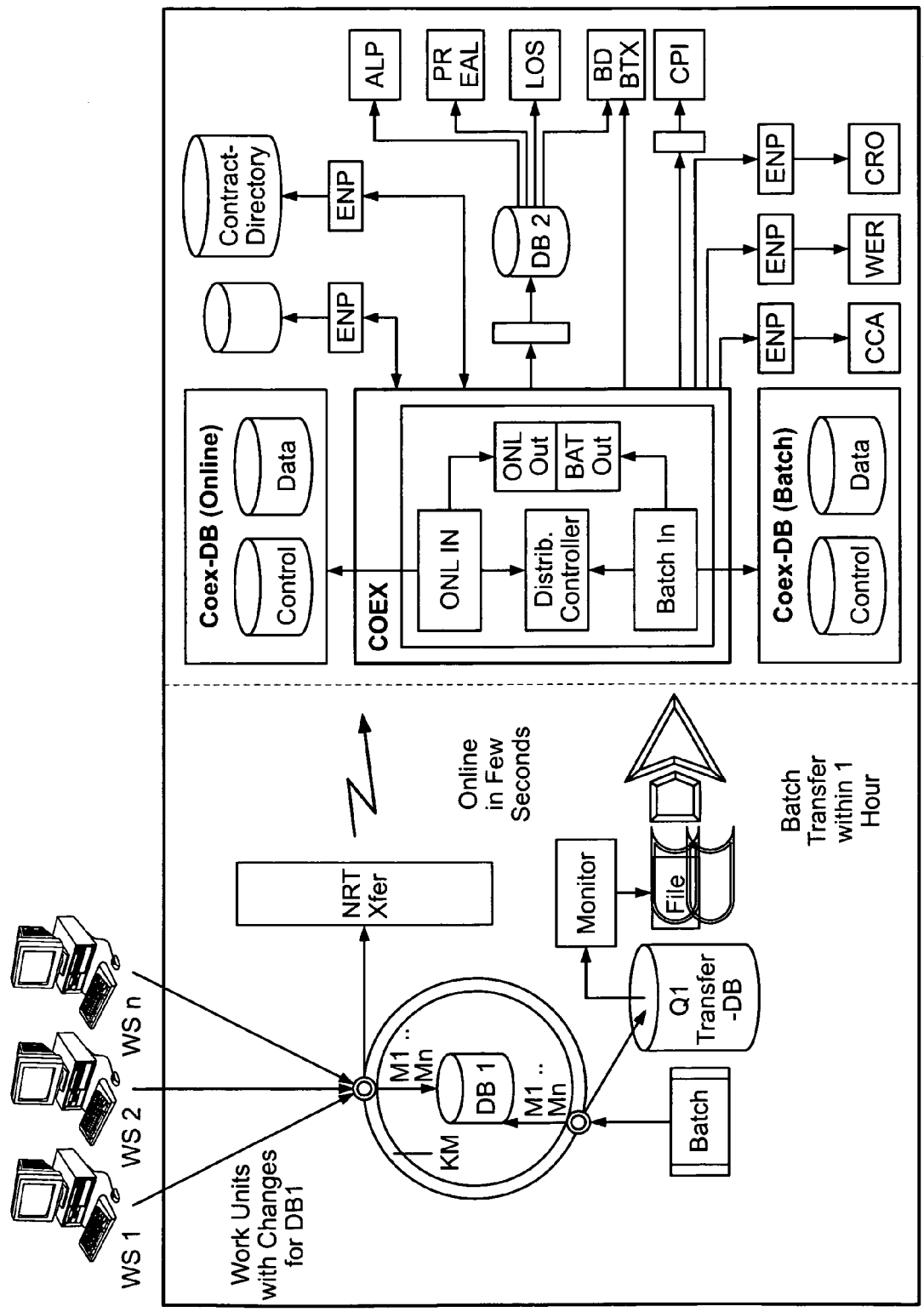
FIG. 1 shows a schematic representation of the first and second databases in their context, and the mechanisms of communication between the two databases.

In FIG. 1, the left-hand side shows the database environment of the first database DB1 and the right-hand side shows the database environment of the second database DB2. On the workstations WS1 ... WSn, changes of the first database DB1 are initiated in the framework of work units UOW by application software programs which run on them. These changes are forwarded to the so-called encapsulation module KM (via a company-wide or worldwide data network, not otherwise shown). The encapsulation module KM is set up and programmed to decompose the work units UOW which are passed to it into one or more messages M1 ... MN, to make the corresponding entries in the first database DB1 and to send the messages M1 ... Mn to the second database DB2. The encapsulation module KM is preferably set up and programmed to test whether it is more efficient (regarding transmission duration and transmission quantity and/or processing cost in the context of the second database DB2) to send the original work unit UOW, as it comes from the workstations W1 ... Wn to access the first database, to the second database DB1 with its content unchanged (but decomposed or distributed into the individual messages if required), or to send the changed entries resulting from the application of the work unit UOW to the first database DB1 (decomposed or distributed into the individual messages if required) from the first database DB1 to the second database DB2. Depending on the result of this test, the corresponding content is then sent.

For this sending of the messages M1 ... Mn to the second database DB2, which takes place practically immediately after the arrival and processing of the corresponding work unit UOW by the encapsulation module KM, a software module nrt Xfer (near real time Transfer) is used for cross-platform message transmission. This is used in database synchronisation to transmit the time-critical changes which occur in online processing almost in real time to the second database DB2, so that the messages which are sent from the first database platform can also be processed on the second database platform.

In a similar way to the above-described transfer of incoming online change tasks, there are also work units UOW which are derived from batch processing tasks, and which a batch processing agent Batch delivers to the encapsulation module KM.

In the same way as in the online case, the encapsulation module KM is set up and programmed to decompose the work units UOW which are passed to it by the batch processing agent Batch into one or more messages M1 ... MN, to make the corresponding entries in the first database DB1 and to send the messages M1 ... Mn to the second database DB2. For this purpose, the encapsulation module KM also tests whether it is more efficient (regarding transmission duration and transmission quantity and/or processing cost in the context of the second database DB2) to send the original work units UOW, as they are handed over by the batch processing agent Batch to access the first database, to the second database DB1 with their content unchanged (but decomposed or distributed into the individual messages if required), or to send the changed entries resulting from the application of the work unit UOW to the first database DB1 (decomposed or distributed into the individual messages if required) from the first database DB1 to the second database DB2. Depending on the result of this test, the corresponding content is then sent. This content is not sent directly to the second database DB2, but written to a transfer database Q1, from which a cross-platform file transfer takes place. For this purpose, a monitor, which accesses the transfer database Q1, and a file transfer program, which transmits the changes from batch processing, converted into messages, in synchronisation to the second database platform in a file-oriented manner, are used.

On the side of the second database platform DB2, a main coexistence controller COEX is used to obtain the change message(s), either online or as a batch file. The main coexistence controller COEX contains several program modules which interact with each other: the ONL-IN module, the ONL-OUT module, the BAT-OUT module and the VERTEIL-REGELWERK (distribution controller) module.

The ONL-IN module is called up by the online software module nrt Xfer from the first database platform with a message, and puts the handed-over message from the first database into a coexistence database COEX-DB. Since the data and Term messages of a transaction can arrive in any sequence, the messages are collected in the coexistence database COEX-DB until all messages of the transaction have been transmitted. To be able to decide about the completeness of the messages of a transaction, for each transaction a packet message is managed in a DB2 table, which receives and keeps up to date the currently transmitted number of messages from the first database and the total number of messages from the first database DB1.

A second DB2 table, which is addressed by the main coexistence controller COEX, is used to store the messages from the first database for further processing.

Before the temporary storage of the messages from the first database DB1, the VERTEIL-REGELWERK module is called up, with the messages from the first database DB1 passed as parameters. The VERTEIL-REGELWERK module, which is described in detail below, returns an OK or must-rollback condition. In the OK case, first the current row of the pointer is updated in the COEX database DB with the flags for supply of the COEX software components. In the error case, the must-rollback condition is returned without further processing to the online agent software module nrt Xfer.

The call of the ONL-OUT module is initiated by the ONL-IN module as soon as it is established that messages from the first database DB1 of a transaction have been completely transported to the second database platform.

In this case, the call takes place as an asynchronous call with SEND NEW REQUEST. At the call, the key of the transaction is handed over from the first database. This involves the "branch" and/or "packet time stamp" fields of the transaction from the first database.

The ONL-OUT module reads the data, i.e. the messages of the transaction coming from the first database DB1 and stored temporarily in the coexistence database (online), in a program loop in the technically correct sequence, and passes them on in order. This is supported by a serial number in the header part of the message. A message which is divided into two or more rows or columns can thus be put back together after being read from the coexistence database (online).

After successful processing of all messages of the transaction coming from the first database, finally the control message for the relevant transaction is marked as done. In this way, the data of this transaction is released for later logical reorganisation.

The BAT-OUT module is a batch processing agent, which contains the read routine for sequential reading of the file which is supplied by the batch processing agent Batch from the context of the first database platform, and controls the work unit UOW. After each reading of a message (consisting of header part, database entry-old, database entry-new), the VERTEIL-REGELWERK module is called, and the message is passed as a parameter. This module is not called for the TERM record.

To minimise accesses and network loading, the messages or the database entries contained in them are not written to the coexistence database (batch) in every case. Instead, a whole packet is read in the BAT-OUT module and held in the program memory, provided that the packet does not exceed a defined size. The packet is only written to the coexistence database (batch) when it becomes too large. The same processing then takes place as in ONL-OUT, and the corresponding coexistence application program elements (software components) are supplied. The data is fetched from the program memory or from the coexistence database (batch) according to position. If a packet cannot be processed, it must then be written to the coexistence database (batch).

Figure 2:
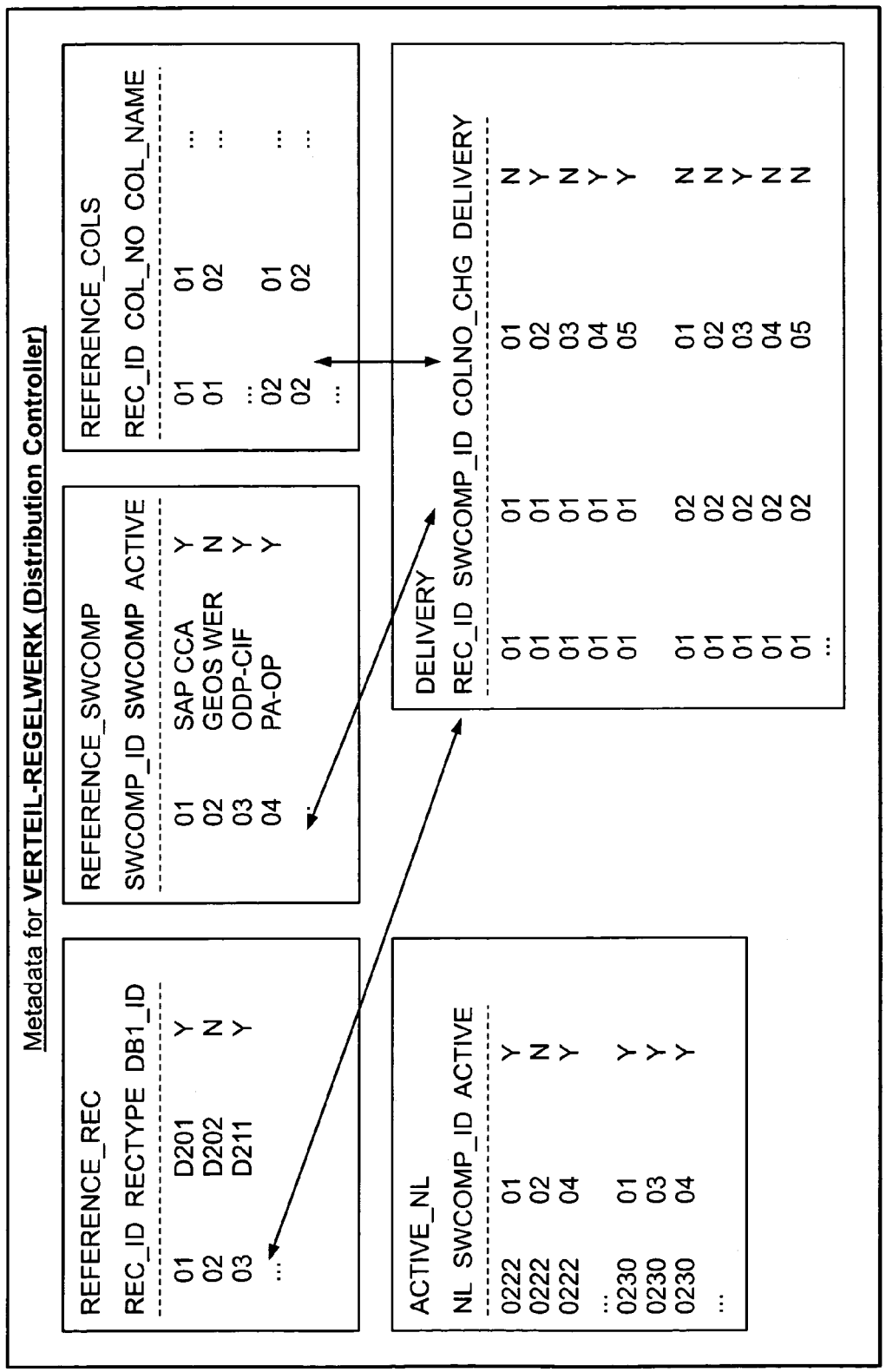
FIG. 2 illustrates a conceptual, normalised model for controller tables, which indicate for which application program elements (software components) of the second database platform a change is relevant.
Figure 3:
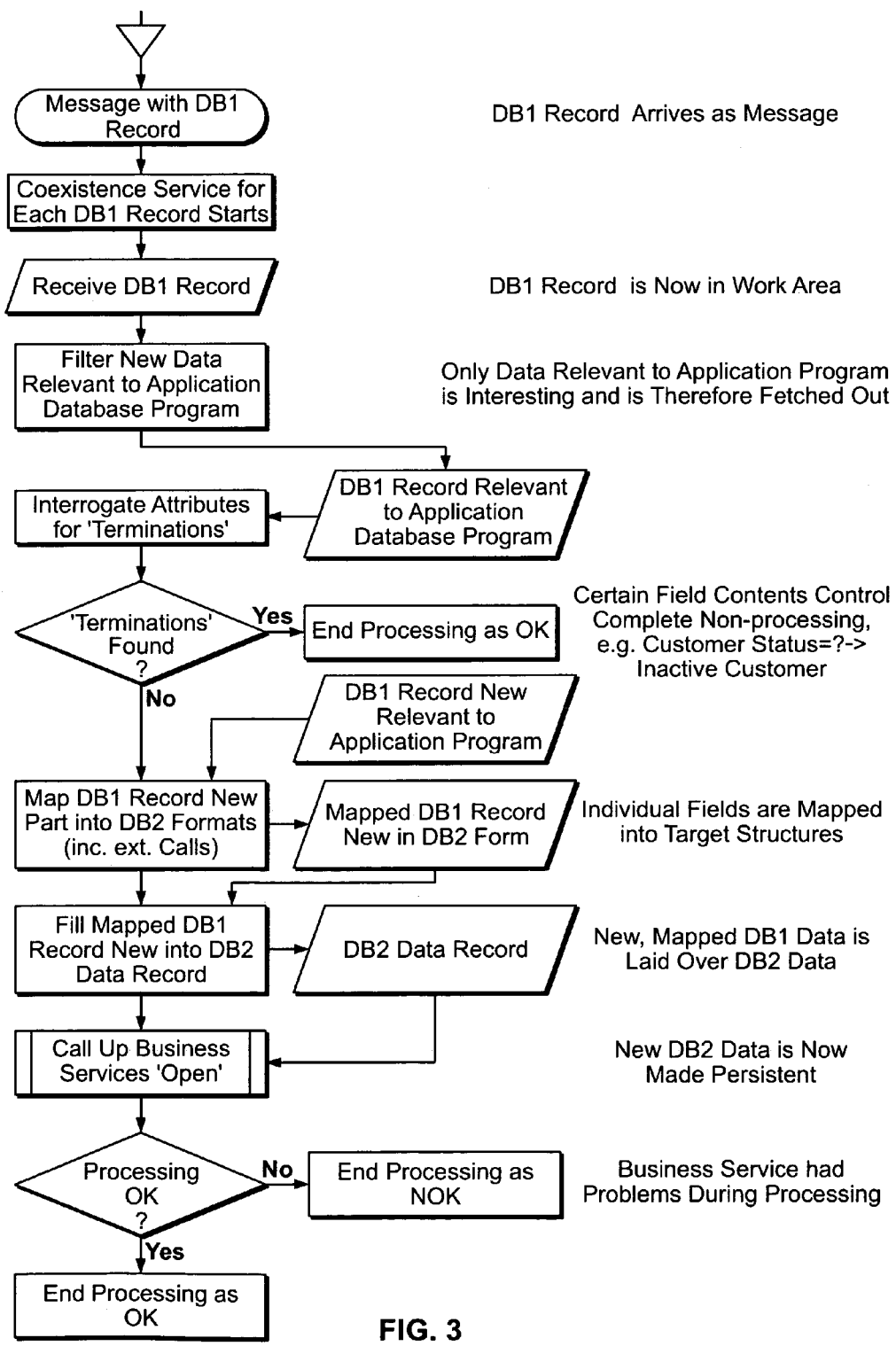
FIG. 3-7 explain on the basis of flowcharts the behaviour in the case of storing and inserting data, the behaviour in the case of modifying data, the behaviour in the case of change of a case, and the behaviour in the case of deletion of a case.
Figure 4:
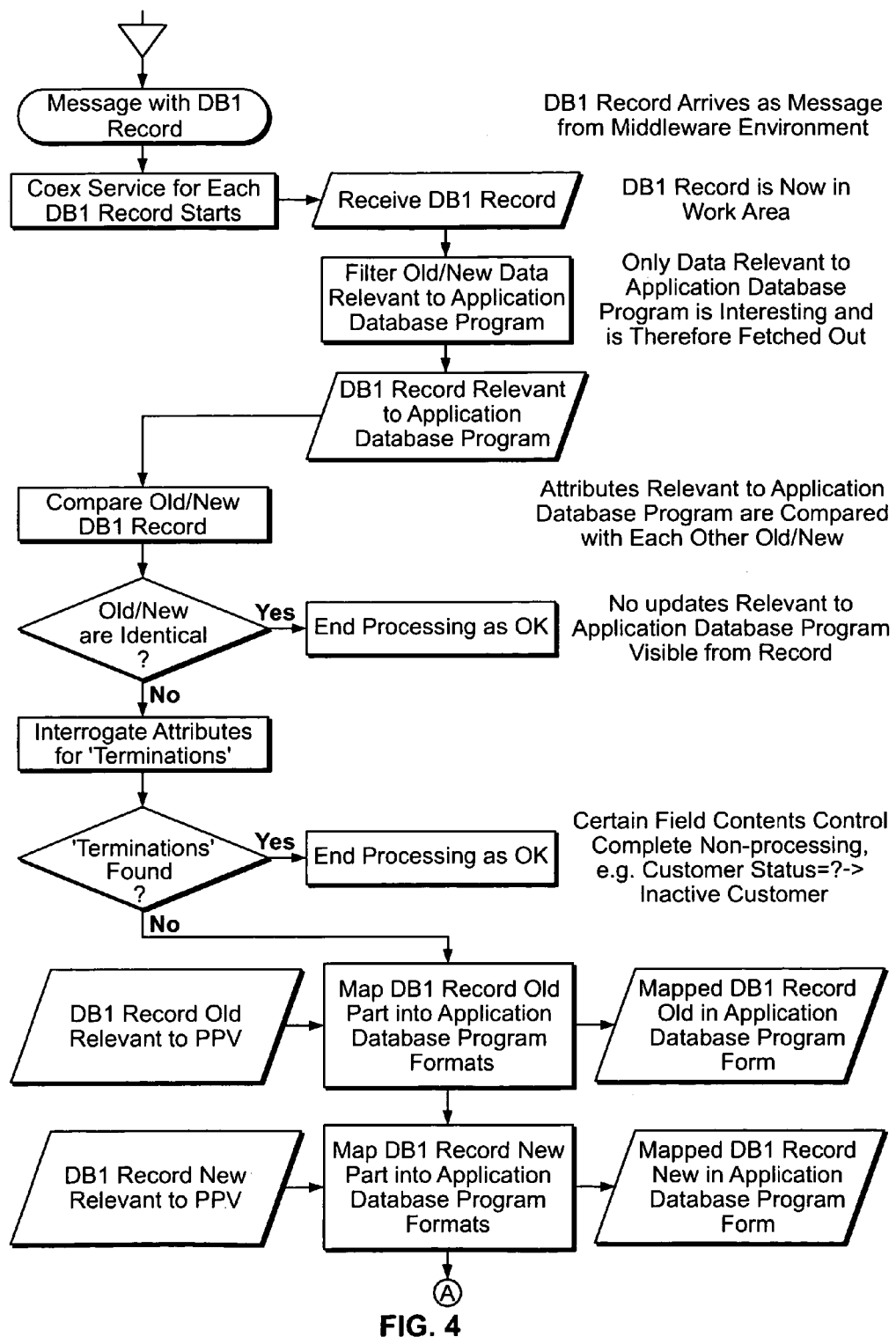
Figure 5:
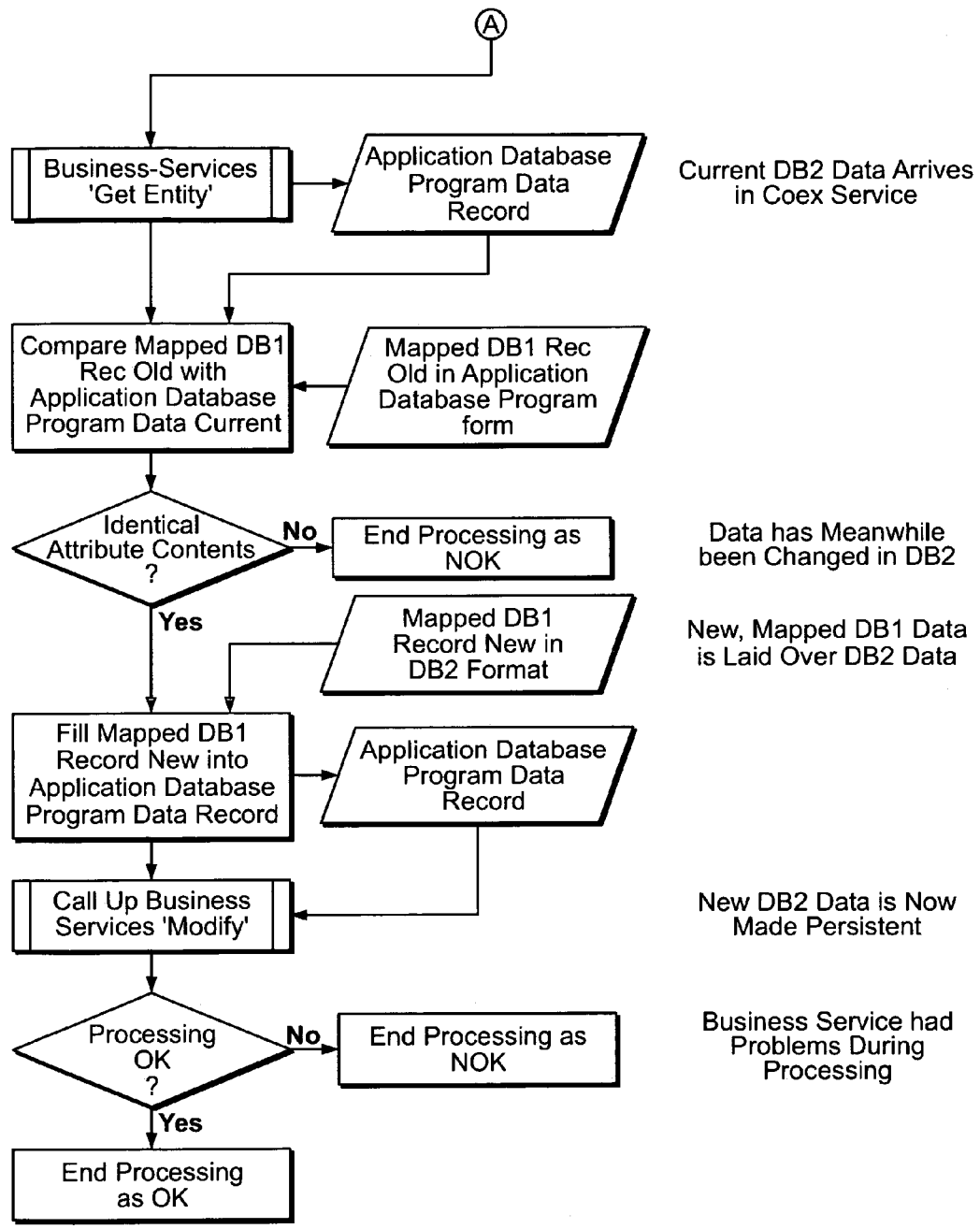
Figure 6:
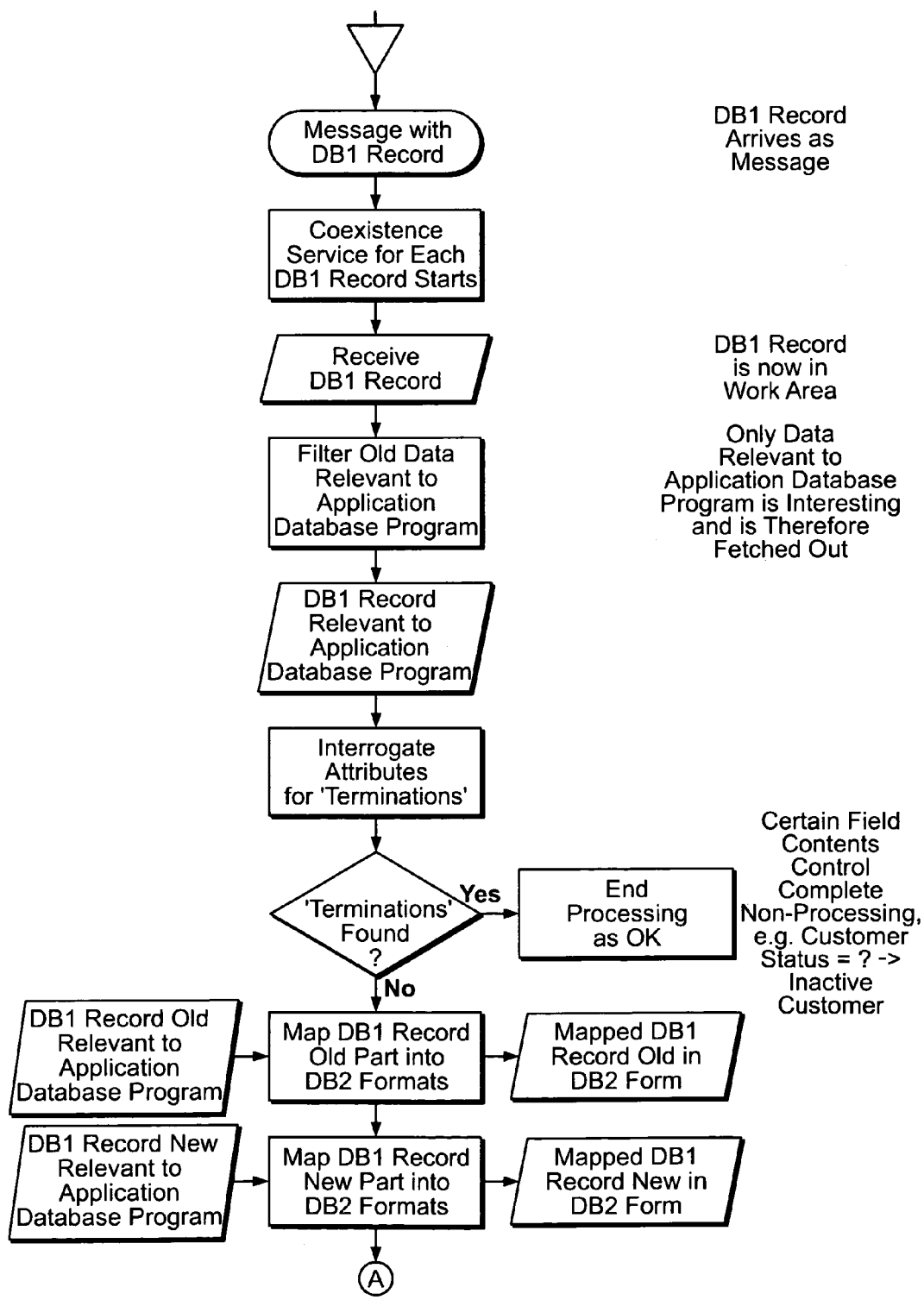
Figure 7:
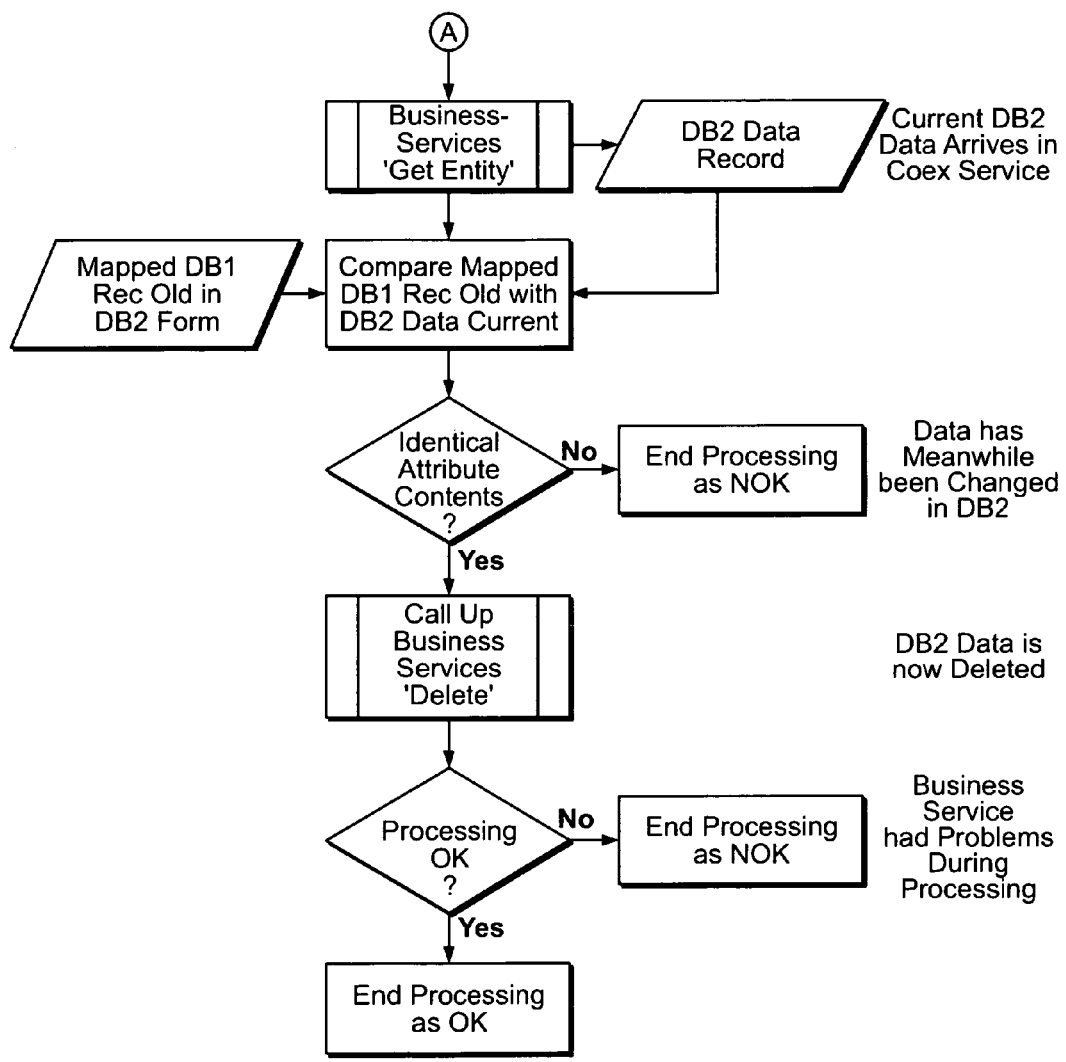
Figure 8:
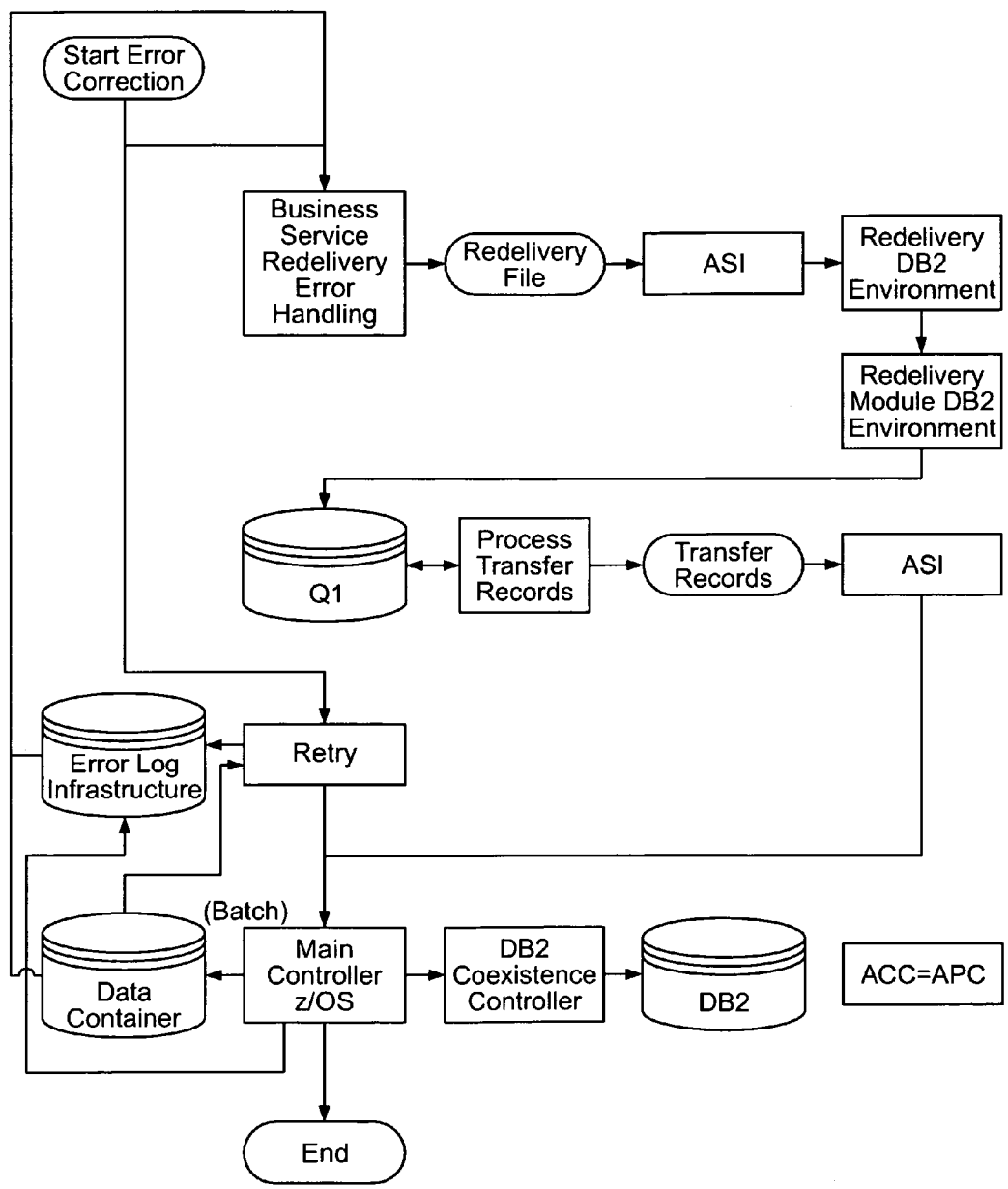
FIG. 8 explains error correction for individual records on the basis of a flowchart.
Figure 9:
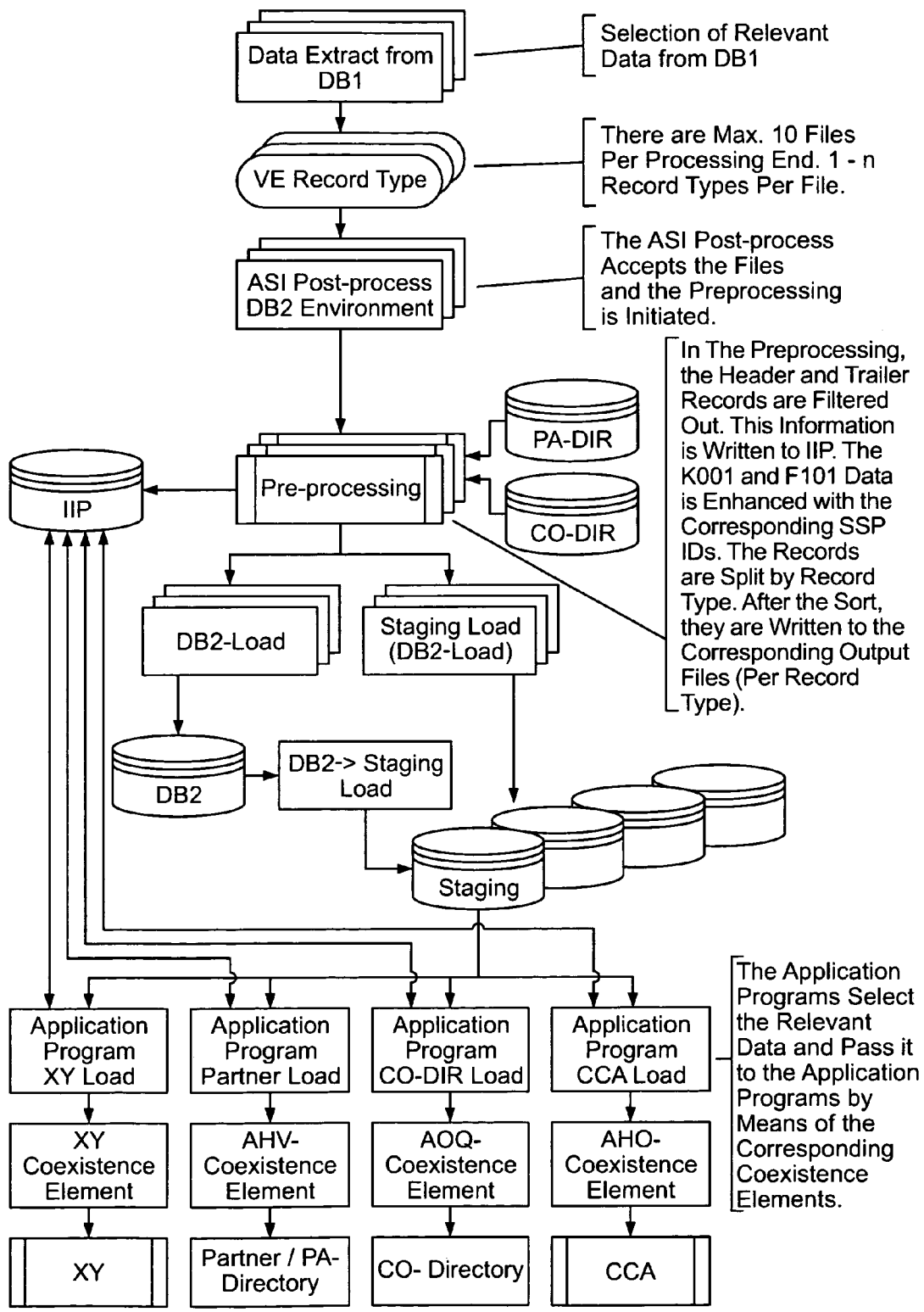
FIG. 9 explains error correction for files on the basis of a flowchart.

The VERTEIL-REGELWERK module receives as input data the messages from the first database platform old (state before change) and the messages from the first database platform new (state after change). Each "old" attribute is compared with "new", to establish whether the attribute has been changed. If a change has taken place, the application program elements (software components) for which this change is relevant are established via tables (see FIG. 2). The message obtains, for each software component, a flag, which identifies whether or not it is relevant to the component. FIG. 2 shows a conceptual, standardised model for the controller tables. Depending on performance requirements, these can be implemented differently.

The following key tables make it possible to set the parameters of the actual controller data efficiently:

REFERENCE_REC

Meaning: In this key table, the following fields are held for the record types:

| REC_ID | (PK) |
|---|---|
| RECTYPE | record type, e.g. D201 |
| DB2_ID | identifier for whether a DB2 key must be determined |

REFERENCE_SWCOMP

Meaning: In this key table, the following fields are held for the COEX application program elements (software components) (e.g. CCA):

SWCOMP_ID, (PK)
SWCOMP, name of software component, e.g. CCA
ACTIVE, flag (value range Y/N), (de)activation of software component REFERENCE_COLS
Meaning: In this key table, the following fields are held for the record types:
  REC_ID, PK, corresponds to REFERENCE_REC.REC_ID
  COL_NO, PK, serial no.
  COL_NAME, name of field in record type
To control processing, the following tables are provided:

ACTIVE_NL
Meaning: (De)activation of data transfer to a software component per branch. This controls whether the data of a branch (irrespective of the record type) is forwarded to a software component.

Fields:
  NL, PK, branch, e.g. 0221
  SWCOMP_ID, PK, corresponds to REFERENCE_SWCOMP.SWCOMP_ID
  ACTIVE, flag (value range Y/N),
  (de)activation of combination of branch and SWCOMP_ID Delivery
Meaning: Defines the conditions on which record types are forwarded to the software components. The conditions are defined by field, e.g.: If in record type 01 (=D201) the field 02 or 04 or 05 is changed, the record must be forwarded to software component 01 (=CCA).

Fields:
  REC_ID, PK, corresponds to REFERENCE_REC.REC_ID
  SWCOMP_ID, PK, corresponds to REFERENCE_SWCOMP.SWCOMP_ID
  COLNO_CHG PK, corresponds to REFERENCE_COLS.COL_NO
  DELIVERY flag (value range Y/N)
  (de)activation of combination of REC_ID, SWCOMP_ID, COL_NO In a preferred embodiment of the invention, a message which is created by the encapsulation module of the first database has the following attributes. As attributes here, fields which allow processing control over all components of the first and second databases are held.

```
05   COEX-IDENT.                              *    ** message identification
10   COEX-MUTPRG        PIC X(06).    *    ** name of change program
10   COEX-AGENTC        PIC X(02).    *    ** agency code
10   COEX-APCDE         PIC X(02).    *    ** application code
10   COEX-NL            PIC X(04).    *    ** processing branch
10   COEX-UFCC-E        PIC X(03).    *    ** program function code
10   COEX-UPTYP         PIC X(01).    *    ** update type
                                      *       S = STORE
                                      *       M = MODIFY
                                      *       D = DELETE (ERASE)
10   COEX-USERID        PIC X(06).    *    ** USERID of responsible person
10   COEX-PAKET-DATUM-ZEIT.           *    ** time stamp of packet
15   COEX-PAKET-DATUM   PIC 9(08).    *       ** date (YYYYMMDD) of
                                                  packet
15   COEX-PAKET-ZEIT    PIC 9(12).    *    ** time (HHMMSSuuuuuu) of
                                              packet
10   COEX-RECORD-DATUM-ZEIT.          *       ** time stamp of change
15   COEX-RECORD-DATUM  PIC 9(08).    *       ** date (YYYYMMDD) of
                                                  change
15   COEX-RECORD-ZEIT   PIC 9(12).    *       ** time (HHMMSSuuuuuu)
                                                  of change
10   COEX-ID.                         *    ** data identification
15   COEX-KDID.                       *    ** customer identification
20   COEX-NL-KD         PIC X(04).    *    ** branch
20   COEX-KDST          PIC X(08).    *    ** customer code number
15   COEX-OBJID         PIC X(20).    *    ** object identification
10   COEX-RECTYP        PIC X(04).    *    ** record type
10   COEX-REC-SEQUENZ   PIC 9(08).    *       ** record sequence number
                                                  (within packet)
10   COEX-ORIGIN        PIC X(01).    *    ** origin of record
                                      *       0 = initial load
                                      *       1 = resynchronisation
                                      *       2 = synchronisation
                                      *       3 = reconciliation
                                      *       4 = RIPEROS
10   COEX-REQUEST-TYPE  PIC X(01).    *       ** processing code
                                      *       O = online processing
                                      *       'B' = batch processing
10   COEX-RESYNC-ID     PIC X(32).    *       ** primary key
                                                  TAPCONLINEPACKAGE
10   COEX-RESYNC-STATUS PIC X(02).    *       ** return code of DB1
                                                  redelivery function
10   COEX-RESERVED      PIC X(06).    *       ** reserve so that header
                                                  remains 150 bytes long
     COEX-DATEN         PIC X(10600). *    ** space for data of first database
```

In the field COEX-PAKET-ZEIT, a time stamp is introduced at the start of the transaction bracket. In the field COEX-REC-ZEIT, a time stamp of the change is introduced. Uniqueness per record type and per record must be ensured. The field COEX-OBJID is initialised with spaces. In the field COEX-REC-SEQUENCE, a record sequence number (within a packet, for TERM=highest sequence number per packet) is entered. In the field COEX-REQUEST-TYPE, in the case of output via batch processing a "B"=batch processing is entered, or an "O"=online processing is entered.

The field COEX-RESYNC-OF is filled with spaces at initial load, must not be changed at resynchronisation, and is filled with the error code at reconciliation. The field COEX-USERID contains the User ID which triggered the change. Must be filled again by the encapsulation module even for batch processing transmission. The field COEX-PAKET-ZEIT contains the date and time (YYYYMMDDhhmmssuuuuuu) of the packet, or of the start of the transaction bracket. All records of a transaction bracket have the same time stamp. The field COEX-REC-ZEIT contains the date and time (YYYYMMDDhhmmssuuuuuu) of the change. Uniqueness per record type and per record must be ensured. This time stamp is used for the detection time of the bitemporal data holding. This means that this value is entered in the BiTemp field BTMP_UOW_START. The field COEX-REC-TYPE contains newly in the case of the encapsulation module the "TERM" record. This marks the end of a transaction bracket. The field COEX-REC-SEQUENCE contains the record sequence number (within a packet, for TERM=highest sequence number per packet). With the record sequence number in a packet, the sequence of changes within a transaction bracket can be restored. The field COEX-ORIGIN contains, depending on the origin of the record: {0, 1, . . . , 4} for initial load, resynchronisation from the first database, synchronisation, reconciliation, and application software. This is required for the COEXistence services, application software and error processing. The field COEX-REQUEST-TYPE contains {O, B} depending on the type of processing in the second database environment: O=online processing, B=batch processing. In this way, the services in the second database environment concerning the (batch) processing can be optimised. In the case of resynchronisation, the field COEX-RESYNC-OF contains the error ID and identifies the error table entry to which a resynchronisation refers. In this way, the status of the entry in the error table can be updated when the resynchronisation is received. The field COEX-BTX-ID marks the resynchronisation for initial load and identifies the table entry to which a resynchronisation refers. In this way, the status of the entry in the error table can be updated when the resynchronisation is received. The encapsulation module describes the COEX-PAKET-ZEIT, COEX-REC-ZEIT, COEX-REC-SEQUENCE fields, which map the transaction bracket from the first database.

For the data of the first database old-new, the 10600 bytes which are mentioned in the header part as 'space' are available. The physical boundary between record-old and record-new is movable, depending on what infrastructure is used. The lengths are not fixed but specified in each case. As an example, the record or copybook for the CIF main record D201 is listed below. The copybook corresponds to the data description of the database record of the first database.

```
******************************************************************
*                                       *
* RECORD: D201SSP NON-DMS COB85 LENGTH: 1644 BYTES REL: 0.1    *
*                                       *
*     GENERATED: 14.08.2001 LAST CHANGE: 30.08.2001       *
* DESCRIPTION: MIGRATION INTERFACE              *
*                                       *
******************************************************************
       05    D201-FILLER-0-SSP    PIC X(12).
       05    D201-DATA-SSP.
       10    D201-DATMUT-SSP      PIC 9(08). *** customer change date
       10    D201-HATIKD-SSP      PIC X(36). *** customer has indicators
       10    D201-HATIKDR-SSP        REDEFINES D201-HATIKD-SSP PIC X(01)
                OCCURS 36 TIMES.
                *** customer has indicators
       10    D201-STATREC-SSP     PIC X(01). *** customer status
       10    D201-FLAGKD-SSP      PIC X(72). *** customer comments
       10    D201-FLAGKDR-SSP        REDEFINES D201-FLAGKD-SSP PIC X(01)
                OCCURS 72 TIMES.
                *** customer comments
       10    D201-FLAGKD2-SSP     PIC X(72). *** customer comments
       10    D201-FLAGKD2R-SSP       REDEFINES D201-FLAGKD2-SSP PIC X(01)
                OCCURS 72 TIMES.
                *** customer comments
       10    D201-FLAGKD3-SSP     PIC X(72). *** customer comments
       10    D201-FLAGKD3R-SSP       REDEFINES D201-FLAGKD3-SSP PIC X(01)
                OCCURS 72 TIMES.
                *** customer comments
       10    D201-FLAGKD4-SSP     PIC X(72). *** customer comments
       10    D201-FLAGKD4R-SSP       REDEFINES D201-FLAGKD4-SSP PIC X(01)
                OCCURS 72 TIMES.
                *** customer comments
       10    D201-FLAGKD9-SSP     PIC X(72). *** customer comments
       10    D201-FLAGKD9R-SSP       REDEFINES D201-FLAGKD9-SSP PIC X(01)
                OCCURS 72 TIMES.
                *** customer comments
       10    D201-NLFLAG-SSP.              *** branch application indicators
       15    D201-NLFLAGKD-SSP    PIC X(01) OCCURS 18 TIMES.
                *** branch application indicators for
```

-continued

```
10  D201-ADID-SSP.              *** address ID;
15  D201-KDID-SSP.              *** customer ID;
20  D201-NL-SSP         PIC X(04).    *** branch
20  D201-KDST-SSP       PIC X(08).    *** customer code number
15  D201-ADRLNR-KD-SSP  PIC 9(04).    *** customer address serial number
10  D201-AGENTC-SSP     PIC X(02).    *** agency code
10  D201-C1D201-CC-SSP. *** technical grouping
                of following attributes: D201
15  D201-B1D201-CC-SSP. *** technical grouping for D201-DOMZIL, D201-NAT
20  D201-DOMZIL-SSP     PIC X(05).    *** domicile
20  D201-NAT-SSP        PIC X(03).    *** nationality
20  D201-AWIRTCf-SSP    PIC 9(01).    *** seat company
15  D201-B3D201-CC-SSP.             *** technical grouping for
                D201-BRANC, D201-BRA
20  D201-BRANC-SSP.                 *** technical grouping for
                D201-BRANC1 and D201-
25  D201-BRANC1-SSP     PIC X(01).    *** UBS sector code
25  D201-BRANC2-SSP     PIC X(03).    *** UBS sector code
20  D201-BRANCHE-SSP    PIC X(05).    *** NACE code (sector code)
20  D201-FILLER-1-SSP   PIC X(03).
15  D201-B2D201-CC-SSP.             *** technical group for D201-SPRACH
20  D201-SPRACH-SSP     PIC 9(01).    *** speech code correspondence
10  D201-C2D201-CC-SSP.             *** technical grouping of various
                address info
15  D201-U1D311-CC-SSP.             *** subgroup of D201-C2D201-CC with
                various address attributes
20  D201-ADRLNR-SSP     PIC 9(04).    *** address serial number
20  D201-VERSART-SSP    PIC 9(01).    *** dispatch type
20  D201-VERSFC-SSP     PIC 9(01).    *** dispatch capability code
20  D201-LEITWG-SSP.                *** route;
25  D201-BETREU-SSP     PIC X(08).    *** route responsible person
25  D201-DATLWGAB-SSP     PIC 9(08).    *** date valid from
25  D201-DATLWGBI-SSP     PIC 9(08).    *** date valid to
20  D201-ADRESSE-SSP.               *** address; higher-level group of
                D201-AD4M24
20  D201-AD4M24-SSP  PIC X(24) OCCURS 4 TIMES.  *** 4 × 24 form address
20  D201-AD2M24-SSP PIC 9(01) OCCURS 2 TIMES. *** short address
20  D201-NAMEI2-SSP   PIC 9(05) OCCURS 2 TIMES. *** surname
20  D201-VORNAMI2-SSP PIC 9(05) OCCURS 2 TIMES. *** forename
20  D201-ORTI2-SSP PIC 9(05) OCCURS 2 TIMES. *** place
20  D201-VERSRT-SSP.                *** dispatch type
25  D201-LANDC-SSP.                 *** delivery country
30  D201-LANDC1-SSP     PIC X(03).          *** delivery country
30  D201-LANDC2-SSP     PIC X(02).          *** delivery country canton
25  D201-TARIFC-SSP     PIC X(01).    *** tariff code
25  D201-PLZ-SSP        PIC X(10).    *** postcode
25  D201-PLZ-PF-SSP     PIC X(10).    *** postcode post office box address
15  D201-U2D201-CC-SSP.             *** technical grouping of
                D201-KUART and D201-D
20  D201-KUART-SSP.                 *** customer type;
25  D201-KDGR-SSP       PIC X(01).    *** customer group
25  D201-REKUART-SSP    PIC X(02).    *** residual customer type
20  D201-DATGR-SSP      PIC 9(08).    *** date of birth or foundation date
10  D201-BETREU-B1-SSP      PIC X(08).   *** customer responsible person (digits 1-4 =
                organisation unit)
10  D201-BETREU-B2-SSP      PIC X(08).   *** specialist responsible person
10  D201-PERS-SSP       PIC X(02).    *** staff code
10  D201-BCNR-SSP       PIC X(06).    *** bank clearing number
10  D201-DATGAB-SSP     PIC 9(08).    *** customer since date
10  D201-DATGBI-SSP     PIC 9(08).    *** customer inactivation date
10  D201-DATKON-SSP     PIC 9(08).    *** death or bankruptcy date
10  D201-DATUM-MIG-SSP      PIC 9(08).   *** migration date merger SBC->UBS
10  D201-INTCODE-SSP.               *** interest field;
15  D201-IGC-SSP    OCCURS 10 TIMES.    *** interest field;
20  D201-IGI-SSP        PIC X(02).    *** interest field - identification
20  D201-IGN-SSP        PIC X(02).    *** interest field - content
10  D201-FLAGFAP-SSP    PIC X(72).    *** appl. indicators of external
                applications
10  D201-FLAGFAPR-SSP REDEFINES D201-FLAGFAP-SSP PIC X(01) OCCURS 72 TIMES.
                *** appl. indicators of external
                applications
10  D201-VIANZ-SSP      PIC 9(05).    *** number of dispatch instructions
10  D201-BOKUOC-SSP     PIC 9(01).    *** exchange customer conditions (BOKUKO)
                occurrence
10  D201-BOKUKO-SSP OCCURS 0 TO 1 DEPENDING ON D201-BOKUOC-SSP
                *** special conditions for
                exchange customers;
15  D201-KUKO-SSP       PIC 9(01).    *** special customer conditions
15  D201-STEKA-SSP      PIC 9(01).    *** canton stamp code
```

-continued

```
15  D201-BROKCA-SSP        PIC 9(03)V9(04).*** calculation basis in % for CA
15  D201-DEPAUT-SSP        PIC 9(01).   *** securities account instruction (automatic)
15  D201-GENLI-SSP         PIC 9(01).   *** code for general delivery system
15  D201-DPSTELLE-SSP      PIC X(04).   *** securities account location
15  D201-ABWKU-SSP         PIC 9(01).   *** special handling conditions
15  D201-SEGA-SSP          PIC 9(01).   *** customer connected to SEGA
15  D201-KUTYPS-SSP        PIC 9(02).   *** exchange-related customer type definition
15  D201-STATI-SSP         PIC 9(01).   *** statistical analysis
15  D201-COUKON-SSP        PIC 9(01).   *** brokerage convention
15  D201-STEAD-SSP         PIC 9(01).   *** stamp code for addressee
15  D201-INTKTO-SSP        PIC 9(01).   *** internal account
15  D201-ABSCHB-SSP        PIC 9(01).   *** code for concluding bank as securities account location
15  D201-TRAX-SYM-SSP          OCCURS 2 TIMES.*** symbol for order transmission;
20  D201-TRAX1-SSP         PIC X(05).   ***---no dsc---
20  D201-TRAX2-SSP         PIC X(03).   ***---no dsc---
15  D201-CEDEL-SSP         PIC X(01).   *** Cedel reference code
15  D201-FILLER-2-SSP      PIC X(03).
15  D201-TITELTYP-SSP      PIC X(02) OCCURS 9 TIMES. *** title type
15  D201-SOFSPEZ-SSP       PIC X(02).   *** Soffex special account
15  D201-LFZHCH-SEG-SSP.               *** delivery Switzerland for SEGA-capable titles;
20  D201-LFZH-CSA-SSP      PIC X(08).   *** delivery Switzerland for SEGA-capable titles
20  D201-LFZH-CSO-SSP      PIC X(08).   *** delivery Switzerland for SEGA-capable titles
15  D201-LFZHCH-BC-SSP.                *** delivery Switzerland for non-SEGA-capable titles
20  D201-LFZH-CBA-SSP      PIC X(08).   *** delivery Switzerland for non-SEGA-capable titles
20  D201-LFZH-CBO-SSP      PIC X(08).   *** delivery Switzerland for non-SEGA-capable titles
15  D201-LFZHUEB-SSP    OCCURS 7 TIMES. *** delivery for country and shares
20  D201-LFZHLAND-SSP      PIC X(03).   *** delivery for country and shares
20  D201-LFZH-AKT-SSP      PIC X(08).   *** delivery for country and shares
20  D201-LFZH-OBL-SSP      PIC X(08).   *** delivery for country and bonds
15  D201-CALAND-SSP OCCURS 9 TIMES.    *** CA calculation for country and security type;
20  D201-CA-LAN-SSP        PIC X(03).   *** CA calculation for country and security type
20  D201-CAVORCD-SSP       PIC X(01).   *** CA calculation for country and security type
20  D201-CABROKCA-SSP      PIC 9(03)V9(04). *** CA calculation for country and security type
10  D201-U3D201-CC-SSP.                *** technical grouping
15  D201-KONTRANR-SSP      PIC X(06).   *** contracting party number
10  D201-SEGANR-SSP        PIC X(06).   *** SEGA subscriber number
10  D201-U4D201-CC-SSP.                *** technical grouping for
                             D201-ZUGRIFFB and D20
15  D201-ZUGRIFFB-SSP      PIC X(02).   *** object with restricted
                             access rights
15  D201-ZUGRIFFB-ALT-SSP     PIC X(02).   *** last 'ZUGRIFFB value' for former
                             staff
10  D201-KDGR-DH-SSP    PIC X(01).   *** contracting party customer group for
                             margin calculation
10  D201-KUTYPS-EM-SSP     PIC 9(02).   *** customer type for issues
10  D201-FLAGMKG-SSP       PIC X(36).   *** marketing selectors for whole bank
10  D201-FLAGMKGR-SSP        REDEFINES D201-FLAGMKG-SSP PIC X(01) OCCURS 36 TIMES.
                             *** marketing selectors for whole bank
10  D201-FLAGMKN-SSP       PIC X(18).   *** marketing selectors for branches
10  D201-FLAGMKNR-SSP        REDEFINES D201-FLAGMKN-SSP PIC X(01) OCCURS 18 TIMES.
                             *** marketing selectors for branches
10  D201-GRUPPANL-KD-SSP      PIC X(02).
10  D201-FILLER-3-SSP      PIC X(01).
10  D201-M2000-SSP.
15  D201-BETREU-1-SSP      PIC X(08).   *** EBS customer conclusion (relation)
15  D201-TELNO-1-SSP       PIC X(15).   *** not maintained
15  D201-BETREU-KD-SSP     PIC X(08).   *** credit officer
15  D201-TRXKT-A-SSP       PIC X(15).   *** account identification of
                             transaction account
15  D201-KTONR-TRX-SSR REDEFINES D201-TRXKT-A-SSP. *** account number of
                             transaction account (Liberty);
20  D201-KTOST-TRX-SSP     PIC X(08).   *** account master of transaction account
20  D201-KTOZU-TRX-SSP     PIC X(02).   *** account addition of transaction account
20  D201-KTOLNR-TRX-SSP    PIC 9(04).   *** account serial number of transaction account
20  D201-FILLER-4-SSP      PIC X(01).
15  D201-TRXKT-UL-SSP      PIC X(15).   *** account identification of
                             transaction account
15  D201-KTONR-UL-SSP REDEFINES D201-TRXKT-UL-SSP. *** account number of
                             transaction account (entrepreneur)
20  D201-KTOST-UL-SSP      PIC X(08).   *** account master of transaction account
20  D201-KTOZU-UL-SSP      PIC X(02).   *** account addition of transaction account
20  D201-KTOLNR-UL-SSP     PIC 9(04).   *** account serial number of transaction account
20  D201-FILLER-5-SSP      PIC X(01).
15  D201-FILLER-6-SSP      PIC X(03).
15  D201-KDSEGM-1-SSP      PIC X(03).   *** customer segment
10  D201-GRP-ZUG-SSP       PIC X(08).   *** group membership code
10  D201-RSTUFE-SSP        PIC X(05).
10  D201-RSTUFE-RIS-SSP    REDEFINES D201-RSTUFE-SSP. *** risk stage;
15  D201-RSTUFE-K-SSP      PIC X(03).   *** group risk stage
```

```
15  D201-RSTUFE-R1-SSP      PIC X(02).   *** risk stage
10  D201-SEX-SSP            PIC X(01).   *** sex code
10  D201-RUECKST-ART-SSP    PIC X(01).   *** A/B reserve type
10  D201-RUECKBET-A-SSP     PIC S9(17) SIGN LEADING SEPARATE.
            *** reserve amount A
10  D201-CRRI-SSP           PIC 9(03).   *** CRRI (Credit Risk Responsibility Indicator)
10  D201-TARIFC-KD-SSP      PIC X(01).   *** tariff code as wanted by customer
10  D201-RKAT-SSP           PIC X(02).   *** risk category
10  D201-FILLER-7-SSP       PIC X(01).
10  D201-TELNO-P-SSP        PIC X(15).   *** private telephone
10  D201-TELNO-G-SSP        PIC X(15).   *** business telephone
10  D201-KRATING-SSP        PIC 9(05)V9(02). *** calculated rating value, Switzerland region
10  D201-KUSEGM-RAT-SSP     PIC X(02).   *** customer segment rating
10  D201-DATUM-TEL-SSP      PIC 9(8).    *** date of last telephone banking use
10  D201-ORGANSCH-NR-SSP    PIC X(04).   *** company group
10  D201-SALDGSF-DUR-SSP    PIC S9(15)V9(02) SIGN LEADING SEPARATE OCCURS 2 TIMES.
            *** assets on last trading day of month
10  D201-STATUS-KC-SSP      PIC X(01).   *** Key-Club subscriber status
10  D201-EROEFDAT-KC-SSP    PIC 9(08).   *** Key-Club opening date
10  D201-DELDAT-KC-SSP      PIC 9(08).   *** Key-Club closing date
10  D201-STATUS-KS-SSP      PIC X(01).   *** Keyshop subscriber status
10  D201-EROEFDAT-KS-SSP    PIC 9(08).   ***opening date of Keyshop subscription
10  D201-DELDAT-KS-SSP      PIC 9(08).   *** closing date of Keyshop subscription
10  D201-DOMZIL-BO-SSP      PIC X(05).   *** domicile of beneficial owner
10  D201-DATSTUD-SSP        PIC 9(08).   *** end of study
10  D201-BETREU-ANR-SSP     PIC X(08).   *** intermed (portfolio manager)
10  D201-GREG-SSP           PIC X(02).   *** countries, region or large region code
10  D201-LANDC-RSK-SSP      PIC X(03).   *** domicile risk
10  D201-NAT-BO-SSP         PIC X(03).   *** nationality of beneficial owner
10  D201-GEPA-SSP           PIC 9(01).   *** private banking company code
10  D201-JUZU-SSP           PIC X(02).   *** legal person (additional identifier)
10  D201-TOGE-SSP           PIC X(04).   *** subsidiary company code
10  D201-KUKO-ART-SSP       PIC 9(02).   *** customer contact type
10  D201-DATUM-KDK-SSP      PIC 9(08).   *** date of customer contact
10  D201-KMU-MA-SSP         PIC X(02).   *** employee size for SME
10  D201-RES-3-SSP          PIC X(06).   *** financial planning
10  D201-VERMGNV-GES-SSP    PIC S9(15)V9(02) SIGN LEADING SEPARATE.
            *** assets on last trading day of month for
                multiple masters, customers
10  D201-VERMGNL-GES-SSP    PIC S9(15)V9(02) SIGN LEADING SEPARATE.
            *** assets on last trading day of month for
                multiple masters, customers
10  D201-DATUM-HR-SSP       PIC 9(08).   *** date of commercial register entry
10  D201-DATUM-CAP-SSP      PIC 9(08).   *** starting date of starting capital
10  D201-ADID-KC-SSP.                    *** third party address ID for Key-Club
            correspondence
15  D201-KDID-KC-SSP.                    *** customer ID of third party address ID for
            Key-Club correspondence
20  D201-NL-KC-SSP          PIC X(04).   *** branch of customer ID
            for third party address
20  D201-KDST-KC-SSP        PIC X(08).   *** customer master of customer ID for
            third party address ID
15  D201-ADRLNR-KC-SSP      PIC 9(04).   *** address serial number of address ID
            for third party address ID
10  D201-DATUM-MM-SSP       PIC 9(08).   *** date of last Multimat use
10  D201-DATUM-TB-SSP       PIC 9(08).   *** date of last telebanking use
10  D201-KREDIT-AWK-SSP     PIC X(02).   *** cost class of credit processes
10  D201-BETREU-STV-SSP     PIC X(08).   *** substitute for responsible person
10  D201-DATUM-AUS-SSP      PIC 9(08).   *** retirement date for staff
10  D201-PLANING-FIN-SSP    PIC X(02).   *** financial planning
10  D201-RES-4-SSP          PIC X(02).   *** reserved field
10  D201-RES-5-SSP          PIC 9(08).   *** reserved field
*********************** END OF RECORD D201-SSP ********************
```

This interface is used twice in the COBOL program, once as 'alt' (old) and once as 'neu' (new):

```
* PARENT(Root):InputRecord
  01 SSP-COEX-REQUEST-BLOCK.
* Header
  COPY AHVCHEAD.
* data
  02 COEX-DAT-D201.
*----------------------------------------
*    COEX-RECTYP = 'D201'
*----------------------------------------
    03 D201-COEX-ALT.
    COPY AHVCD201.
    03 D201-COEX-NEU.
    COPY AHVCD201.
```

For database changes (Write, Rewrite, Erase), the following DB primitives are conventionally used:

.ADD DBWRITE,RECORD
.ADD DBREWR,RECORD
.ADD DBERASE,RECORD

A primitive in turn consists of a macro, which is written in Delta, and a Cobol module. The macro makes the same interface available to both the first database and the second database, but can also access new Cobol modules in the background. The Cobol module uses infrastructure components of the second database, to provide the processing in the new environment (of the second database) according to the old function (i.e. as in the first database platform environment).

The encapsulation module is used to encapsulate all software programs which access the first database and have a changing effect, using the DBWRITE, DBREWRITE and DBERASE primitives, on the (sub-)databases of the first database.

As soon as the first database or one of its (sub-)databases is changed, according to the invention a general module is called up. This does a plausibility check and calls sub-modules (DBWRITE module, DBREWRITE module, DBERASE module: change proof module) instead of the above-mentioned DB primitives. A parameter field describes which change type is involved. The general module contains the corresponding DB primitives, and is responsible for tracking on the second database. To ensure that the changes of several programs are not mixed, a packet is formed for each logical processing process. A logical processing process will generally correspond to a work unit. This is clarified on the basis of the following example for a module called CI0010:

Module CI0010
    Parameters
    T001ACA
    P005PPVC
    CI0010-RECORD-ALT
    CI0010-RECORD-NEU
    P005PPVC contains the following fields among others:

| | |
|---|---|
| P005PPVC-DB1-UPDATE | track first database (Y/N) |
| P005PPVC-SSP-UPDATE | track second database (Y/N) |
| P005PPVC-MUTPRG | program or transaction name |
| P005PPVC-NL | processing branch |
| P005PPVC-NL-S | branch of responsible person (ONLINE) |
| P005PPVC-TZE | terminal central unit (ONLINE) |
| P005PPVC-TRID | terminal identification (ONLINE) |
| P005PPVC-UFCC-E | program function code (ONLINE) |
| P005PPVC-UPTYP | DB update type |
| | D = DELETE (ERASE) |
| | M = MODIFY (REWR) |
| | S = STORE (WRITE) |
| P005PPVC-USERID | User ID of responsible person (ONLINE) |
| P005PPVC-SACHBKZ | short code of responsible person (ONLINE) |
| P005PPVC-KDID | customer ID |
| P005PPVC-OBJID | object ID/address serial number |
| P005PPVC-RECTYP | 4-character record type (e.g. K001) |
| P005PPVC-FUNKTION | call function |
| | I = Init work unit |
| | P = Process work unit |
| | T = Terminate work unit |
| | A = IPT (only if one record per unit) |
| P005PPVC-TRANSFER-KEY | key of logical work unit |
| P005PPVC-STATUS | return status |
| | (corresponds to T001-STATUS) |

Call of CI0010

| |
|---|
| CALL "CI0010" USING T001ACA |
|     P005PPVC |
|     CI0010-RECORD-ALT |
|     CI0010-RECORD-NEU |

According to the invention, each logical work unit contains the following module calls:
    one call with the "Initialise" function (opens a packet for the second database)
    N-1 calls with a processing function "Process" (Write, Rewrite, Erase, which are inserted in the packet)
    one call with the "Terminate" function (closes the packet for the second database)

DB changes which take place via batch processing programs are not transmitted directly (online) to the second database, but are stored first in a transfer database Q1. This database is opened and closed by the encapsulation module.

The content of the transfer database Q1 is combined into files under the control of a monitor and sent by file transfer to the second database platform.

Below, the flow in a database component in the environment of the second database platform is explained as an example. The coexistence elements can be used for online synchronisation, batch processing synchronisation and initial loading of the second database.

Sequence problems (messages overtaking each other in online synchronisation or differences between online and batch synchronisation) can be handled as follows:
    By reading the data of the second database before it is changed. For this purpose, in the application programs and (sub-)databases of the second database platform, the data before change is read and the relevant fields are compared with those of the message. Fields to be changed should have the same version in the second database as in the 'old' message.
    Alternatively, the time stamp of the first database can be compared with the time stamp of the second database. The change time stamp of the first database is 'with'-stored in the second database. Before change, the time stamps are compared. The with-stored change time stamp of the first database in the second database must be older than the new time stamp of the first database from the message.
    Finally, in a further alternative, the data can be held in the second database DB2 in parallel (bitemporary). In this case, each record can simply be inserted. The time series in the second database DB2 are managed on the basis of the change time stamp of the first database. Testing DB1-old against DB2-current excludes any sequence problems. The processing is controlled via a code table. The controller must be set to 'off' for the application database programs of the second database.

The behaviour in the case of storing and inserting data, the behaviour in the case of modifying data, the behaviour in the case of change of a case, and the behaviour in the case of deletion of a case, are explained on the basis of the flowcharts of FIGS. 3-7.

In the first database platform DB1, the entries (master data, persons, etc.) are uniquely identified by "customer numbers", one customer with several customer numbers being managed in the end like several different customers. For this purpose, objects (account, safe, securities account, etc.) are defined, and are identified by similarly constructed account, securities account, safe numbers, etc. These objects are then always assigned to one customer.

In contrast, in the second database platform DB2, the entries, the customers and the objects are all uniformly and uniquely identified by "DB2 identifiers". These "DB2 identifiers" are completely independent of the "customer numbers" of the first database platform DB1.

During the whole coexistence phase of the two database platforms, stable translation between the numbers of the first database and the "DB2 identifiers" is provided. For this purpose, "translation tables", which are managed by the coexistence controller, are used.

The relation DB1 customer number <->"DB2 identifier" (customer) is done by a special software program component "Partner Directory" (see FIG. 1). The relation DB1 object number <->"DB2 identifier" (objects) is done in the software program component "Contract Directory" (see FIG. 1).

These relations are set up with the first productive data takeover (initial load) from the first database into the second database, and extended with each data takeover and/or data tracking.

From the time of the first productive data takeover, these relations are no longer changed; they are only "extended" or supplemented.

The loss of one of these relations makes it necessary to recover the corresponding Directory.

In the case of translation of a DB1 number into the associated "DB2 identifier", the procedure is according to the following algorithm:

For a DB1 number, does the corresponding "DB2 identifier" already exist in the software program component "Partner Directory" or in the software program component "Contract Directory"?

| | |
|---|---|
| If "YES": | Use the found DB2 identifier. |
| If "NO": | Generate a "new", unique DB2 identifier and enter it, together with the DB1 number, into the relevant relation of the software program component "Partner Directory" or "Contract Directory". |

When newly opening a DB2 identifier, enter the absolutely necessary accompanying attributes for it in the second database platform. This newly opened DB2 identifier can be used.

This algorithm is called and processed everywhere in the environment of the second database platform where the corresponding DB2 identifier for a DB1 number must be determined. This includes (among other things) the above-described migration accesses, the "sister" transactions, application software programs CCA, SPK, ALP, BD/BTX, DB2 (see FIG. 1), all user-oriented services which operate on master data on the side of the second database.

For this forward conversion algorithm, preferably one variant for use in batch processing operation, and one variant for use in online operation are both provided. For both implementations, it is the case that they are designed for multiply parallel use.

For the flows and transactions which safeguard coexistence, e.g. "sister" transactions, translation from the DB2 identifier to the associated DB1 number is also required. For this purpose, preferably one variant for use in batch processing operation, and one variant for use in online operation are both provided. For both implementations, it is likewise the case that they are designed for multiply parallel use, and in the result of this reverse translation the most important attributes of the customer or object are preferably also output.

The change messages to the various coexisting application software programs CCA, SPK, ALP, BD/BTX, DB2 (see FIG. 1) are distributed by the ONL OUT and BAT OUT modules in the coexistence controller (see FIG. 1), according to which path the messages from the first database DB1 arrive in the second database platform on. The change messages are transmitted to those application software programs CCA, SPK, ALP, BD/BTX which have their own data holding (database) which only they maintain, as well as to the second database DB2. In this example, these are the databases of the Partners, Contract and Product Directories, Core Cash Accounting (CCA), and other application software programs. In a similar way to the coexistence controller, each of the individual application software programs to which the change messages are transmitted has an input message buffer ENP. In them, groups of associated messages can be recognised. They are collected in the coexistence controller, and placed together as a whole group in the input message buffer ENP of the affected application software programs. The logic of the distribution to the application software programs is according to the following principles:

Only whole, i.e. complete, change messages are placed in the input message buffer ENP of the affected application software programs. There is no exclusion of individual attributes.

In the case of groups of associated records, only the whole, combined message is sent.

An application software program only receives the message in its input message buffer ENP if it is "affected" by the change or message.

For each incoming change or message, it is established on the basis of the "old"/"new" record what attributes are changed. This is required as an input parameter, to establish in a table "attribute-affects-application-software-program", which is described in detail below, to which application software programs the change/message is to be sent, apart from the second database DB2. This does not apply to "Insert" and "Delete" messages. Also, a table "record-type-distribution", which is also described in detail below, is held, to establish whether an application software program is "affected" by the message/change. The coexistence controller controls the distribution of the message/change correspondingly.

The "record-type-distribution" table is a static table which is maintained manually. The ONL OUT and BAT OUT modules read this table for each of the application software programs, but never write to it.

The table has two dimensions: components and record type.

For each component (application software program), there is a row. The components are identified by their names, e.g. Partners, the Contract and Product Directories, Core Cash Accounting (CCA) and others. New components can be added at any time.

For each record type which the encapsulation module KM sends, there is a column. The functionally encapsulated transaction messages each count as a separate record type.

In the individual fields of the table, there can be the values {0, 1, 2}. They have the following meaning:

"0": The component is NOT interested in the record type.

"1": The component is basically interested in the record type, but it receives the message only if it is affected by a changed attribute (see below).

"2": The component is interested in the record type and always receives the message.

The table "attribute-affects-application-software-program" table is a static table which is maintained manually. The ONL OUT and BAT OUT modules read this table for each of the application software programs, but never write to it. The table has three dimensions: record type, components and attributes.

- For each record type which the encapsulation module KM sends, there is a two-dimensional sub-table.
- For each component (application software program), there is a column in the two-dimensional sub-table. The components are identified by their names, e.g. Partners, the Contract and Product Directories, Core Cash Accounting (CCA) and others. New components can be added at any time.
- For each attribute of the record type, there is a row in the two-dimensional sub-table.

In the individual fields of the two-dimensional sub-table, there can be the values {0, 1}. They have the following meaning:

- "0": The component is not dependent on the attribute of the record type. This means that the relevant attribute is neither held in the local data of the component nor used in a mapping rule. The component is NOT "affected" by the attribute of the record type.
- "1": The component is dependent on the attribute of the record type. This can mean that the relevant attribute is held in the local data of the component; it can also mean that the attribute is used in the mapping rules for the maintenance of the local data of the component. The component is "affected" by the attribute of the record type.

A further aspect of the invention is at least one software program component, by which, in the case of a transaction which is initiated from one application workstation on the first database, a so-called sister transaction is called up on the second database, and vice versa. In this case, from the point of view of the application workstation, the sister transaction on the side of the second database behaves analogously to its counterpart on the side of the first database.

By porting transactions as so-called sister transactions, the functions, services and data which exist at the first database platform are made available as quickly as possible in the context of the second database platform. According to the invention, the same source programs are used. This makes it possible, during the migration phase, to maintain (and modify if necessary) only one source code, i.e. that of the first database platform. When the sister transactions are activated in the context of the second database platform, the interfaces of/to the application software program(s) are not changed.

A sister transaction consists of one or more software program modules. A software program module is a Cobol program, which contains the processing logic instructions and accesses the system via primitives. A primitive in turn consists of a macro, which is written in the Delta computer language, and a program module, which is written in the Cobol computer language. The macro makes available, in the second database environment, the same interface as in the first database environment, but accesses new Cobol modules in the background. The Cobol module uses the infrastructure of the second database components to ensure that processing takes place in the new environment according to the old function.

A sister transaction in the second database environment is an identical duplicate of the appropriate transaction in the first database environment, with the difference that the system environment (authorisation, transaction processing middleware, database and help macros) is simulated on the second database side.

The interfaces of the sister transactions in the second database environment correspond to the original transactions in the first database environment. As long as the first database environment is the master, all changes of the data stock are carried out via the original transactions in the first database environment. Read-only sister transactions can be activated on the side of the second database environment. During this time, record-oriented and functional synchronisation takes place between the second database environment and the first database environment. For functional synchronisation, before the switch to the second database as master, modifying or writing sister transactions can be used. For this purpose, the same message which has already been processed in the context of the first database is transmitted. In this case, no revalidation takes place on the side of the sister transactions.

The changes which are carried out in real time on the side of the first database use the encapsulation module of the first database. In this way, the changed entries (records) from the first database can be synchronised into the second database. On the side of the second database, the records are sent to the main coexistence controller, which tracks the coexistence element programs and the corresponding application program elements in the context of the second database platform. The encapsulation module is ported once and then adapted to the environment of the second database. In this way, changes to the database contents can be sent via the main coexistence controller to the coexistence element programs and the corresponding application program elements, in the context of the second database platform. Modifying sister transactions use the same mechanism as record synchronisation to write to the second database and the corresponding application program elements in the context of the second database platform.

After all sister transactions are available in the second database environment, this is defined as master. From this time, all real time (but also batch processing) changes take place via the sister transactions, which trigger the synchronisation to the first database after a successful change of the second database. This synchronisation takes place in this phase exclusively functionally, i.e. all incoming messages or transactions are passed on unchanged to the first database and tracked there. As soon as this phase is concluded, the sister transactions can be replaced.

In the case of synchronisation in the direction from the first to the second database, the synchronisation is either record-oriented or functional. The transactions were divided into three categories. This makes it possible to prioritise the application software programs to be ported.

A first type of transactions triggers record-oriented (i.e. database-entry-oriented) synchronisation. These transactions must be used if only a few entries in the first database are affected by such a change.

A second type of transactions triggers functional synchronisation. These transactions must be used if a relatively large number of entries in the first database are affected by such a change.

In the case of record-oriented synchronisation, the encapsulation module transmits all entries which are changed by a transaction of the first database to the main coexistence controller. The main coexistence controller first calls up the coexistence utility program(s) of the coexistence element of the second database environment, to bring the entries and/or the changes of the first database into the second database environment. After a successful change of the second database entries, the main coexistence controller calls up the coexistence element(s) and/or the coexistence utility programs of the application software programs (e.g. Partners), which contain the adaptation rules (mapping logic) from the first to the second database and/or to the application software programs in the second database environment.

In this case, the sister transactions of the first database environment are not required to bring the data successfully into the second database environment.

In the case of functional synchronisation, it is not those entries of the first database which are changed by one or more transactions which are transmitted in real time to the main coexistence controller via the encapsulation module and the synchronisation infrastructure, but the original input message which was sent to the transaction(s) of the first database. The main coexistence controller recognises, because of the message identifier, that an input message and not a record message is involved, and forwards the processing directly to that one of the sister transactions of the first database which carries out the same processing. When the encapsulation module of the first database is also ported, all changes of the second database can also be done via the sister encapsulation module of the first database. This sister encapsulation module sends the change as a record message to the main coexistence controller, which as in the case of record synchronisation calls up the coexistence elements and/or the coexistence utility programs of the application software programs (e.g. Partners), which contain the adaptation rules (mapping logic) from the first to the second database and/or to the application software programs in the second database environment.

In this case, the sister transactions are used to bring the data in the correct format (e.g. as dependent records) into the second database, and to trigger the synchronisation to the application software programs. However, online validation is not carried out in the context of the second database, because the content has already been validated in the context of the first database. Validation of the content in the context of the second database is activated only when the second database is master.

Since the transactions on both sides are identical, all changes take place exclusively via a sister encapsulation module in the first database context. The encapsulation module modifies the second database synchronously using database macros. The encapsulation module then sends the same records also to the main coexistence controller as are sent to the coexistence elements and/or the coexistence utility programs of the application software programs (e.g. Partners) in the case of record synchronisation, so that they can be synchronised.

As explained above, there are basically two different ways of initiating sister transactions.
1. Via HostLink
2. Via message-based synchronisation through CART. CART is a middleware solution, which offers secure, asynchronous, store-and-forward communication between distributed applications on different platforms.

Below, what essential information/data for the second database platform is present at what location in the total system, and where it comes from, are explained.

If a sister transaction is requested via Hostlink, the request reaches an online root program. In the online root program, what transaction and function are requested is determined. On the basis of the desired transaction code and the corresponding function code, the corresponding routine is then called using Call.

E.g.: CALL CIFRoutine USING AQYGENERAL T371TPINFO

The routine can then, in the processing, request additional information such as Input Message or Terminal Record using further TP primitives. This information too is provided by Hostlink.

In the case of functional synchronisation, in the context of the first database a CART message is built and sent into the environment of the second database. This message contains, as well as header parts, all necessary data so that the sister transaction can do the processing without using TP primitives.

This CART message is received by the main coexistence controller. In the coexistence header part, the main coexistence controller recognises that a message from the environment of the first database is involved and not a database entry. The main coexistence controller therefore forwards the message to the functional root program in the context of the second database.

In this root program, the message is decomposed and prepared so that the corresponding sister routine can be called using CALL.

CALL CIFRoutine USING AQYGENERAL T371TPINFO MESSAGE-BUFFER

Format of synchronisation message:

| Header part | USER PART | | |
|---|---|---|---|
| CART | coexistence | TP data | message buffer |

The CART header part contains technical information which is necessary for routing the message to the main coexistence controller.

In the coexistence header part, as well as further technical data, there is the function code of the transaction, so that the main coexistence controller can detect that a functional synchronisation message which is intended for the functional root program is involved.

The USER PART TP data contains the data which is requested in the online case using TPGET TPINFO (e.g. branch of object). This data is needed by the root program and by the sister transaction.

The USER PART message buffer depends on the corresponding transaction, and contains, as well as the user input, important key information.

The sister transaction can establish via the function code whether a message which is received via functional synchronisation (CART) or online (Hostlink) is involved.

If a Hostlink input message is involved, the sister transaction carries out the full validation of the message including any additional authorisation, and triggers the change of the database via the encapsulation module. The input message is fetched via the TP primitive TPGET IMSG, and the user is again informed of the corresponding success (failure) using TP primitives. The encapsulation module updates the second database directly using DB macros, and the main coexistence controller is used to update the coexistence elements and/or coexistence utility programs and/or the application software programs (e.g. Partners).

In the case of functional synchronisation, the processing has already been carried out on the first database, and is now also tracked in the second database and the application software programs. All validation/authorisation is therefore bypassed. The message is processed directly, and the changes are initiated via the encapsulation module. Since in the case of a functional synchronisation message there is no Hostlink connection to the user's workstation, no TP primitives can be used. The sister transaction therefore reads all necessary information from the passed TP primitive (T371TPINFO) and the message buffer.

A comparison is carried out between the first and second databases, to obtain a statement about the equality of the information content of the two databases. Starting from the data comparison, according to the invention a report (error log file) about the errored and/or missing records is produced. Finally, a function to correct the errored and/or missing records is also provided.

Which processing unit of the first database should be checked in relation to the second database is controlled daily on the basis of a plan and a reference table. This reference table is automatically synchronised between the two databases. If nothing is to be processed, the reference table must be adjusted. The reference table indicates which processing unit can be compared on which day. The construction and logic are as follows:

The tasks run EVERY day at 05:00. The programs call up the reference table with the key "CI/0005/wt/1/RECON" ("wt" is the current day of the week (01 to 07))

The structure of the reference table is as follows:
Processing unit: 01/02/03/04/05/06/07/08/09/10/11/12/13/14/15/16/17/18/34

If the processing unit is present on the first database in which the program runs, there is processing. On the second database, in the unload program, the corresponding processing units are converted into partition criteria and selected correspondingly. The record types to be processed are in the reference table and are divided by area:
AL:D101/D111
KD: D201/D211/D212/D214/D215/D216/D217/D219/D220/D222/D225/D226/D535
AD: D311/D321/D322
DP:F11/F111/F112/F113/F114/F115/F116/F117
SF:F201/F213/F214/F216/F217/F219
SV:F230
KT:K001/K002/K004/K005/K006/K007/K010/K011/K012/K013/K016

Only those records which have been selected are processed. In total, only one reference table access per system and reconciliation run is necessary.

For this purpose, a data container with a control table and a data table is provided. It is used to simulate the transaction bracket in the context of the first database in the context of the second database. Errored records from the data comparison are also written to this container.

This error detection and processing is based on the infrastructure of the error log file and data container. During the synchronisation, all messages are written to the data container and processed from there. If an error occurs during synchronisation, the data is identified as such. A link from the data container to the error log file is then created and the errors are then displayed.

For this purpose, the software program components error log file, data container, error processing during synchronisation, redelivery and data equalisation are combined into one logical unit. The GUIs which allow consolidated reporting of the synchronisation, initial load and data equalisation components are made available. The option of manually initiating a redelivery for data correction because of an entry is also provided.

With a repeat function, an identified difference between the first and second databases can be corrected immediately.

Another function, the redelivery function, includes a set of functions to select an errored or missing record in the context of the second database in a table, to generate a corresponding change and to propagate it via the synchronisation process back into the context of the second database. The redelivery function corrects three possible errors:

A record is absent from the first database, but present in the second database.

A record is present in the first database, but absent from the second database.

A record is present in the first database, but present in the second database with the wrong contents.

The data comparison system compares the data stocks of the two databases with each other and discovers as many differences as possible. If the data structures on the two systems are almost identical, a comparison can easily be carried out. An essential problem is the very large quantities of data which must be compared with each other at a specified key point (in time).

Error detection includes, on the one hand, withdrawing and processing the data from the two databases. For this purpose, hash values are calculated and compared with each other. If there are differences, the data is fetched from the appropriate databases. Another part of error detection is a comparison program, which compares the corrupted data from the first and second databases in detail and documents differences in the error log file of synchronisation (and the data for it in the data container). In the data container, there is then an immediate attempt to apply the new data to the corresponding database by carrying out the repeat function.

Error analysis includes processing functions of error processing, to analyse the data from the error log file and data container and to link them to each other. This data is then displayed by a GUI (Graphical User Interface). The analysis of what error is involved can then be carried out manually if necessary. Also from this GUI, so-called batch redelivery functions and a repeat function (retry) can be initiated.

In the case of error correction, there are 3 versions:

A redelivery of individual records and/or the repeat function (retry). Error correction writes the errored data to the data container, from which the correction functions are initiated.

A partial initial load or mass update is identical to initial load.

In the case of an initial load, the affected tables are first deleted.

In the context of error correction, the following data structures among others are read and written:
data container
error logs
unload files
hash files
conversion file
comparison file
redelivery file
Q1 database For the unload files, the same data structures as those of the initial load-unload files are used.

The hash file has the following structure:

```
000001*  **                                             00000100
000002*  ** Hash record for Abacus/ODP CIF reconciliation
         00000200
000003*  **                                             00000300
000004*  ** References to change comments
         00000400
000005*  **
         00000500
000006*  ** Release ODP/CIF EFP 03/2003
         00000600
000007*  **
         00000700
000008    05   HASH-RECORD-DATA.
         00000800
000009*  ** Record type                                 00000900
000010    10   HASH-RECTYP       PIC X(04).
         00001000
000011*  ** Level 3 key                                 00001100
000012    10   HASH-KEY.
         00001200
000013*  ** Level key                                   00001300
000014    15   HASH-NL           PIC X(4).              00001400
000015    15   HASH-KDST         PIC X(8).              00001500
000016*  ** Level 2 key                                 00001600
000017    15   HASH-LEVEL2       PIC X(20).
         00001700
000018*  ** Level 2 key redefines
         00001800
000019    15   HASH-OBJID        REDEFINES HASH-LEVEL2.
         00001900
000020    20   OBJID             PIC X(20).
         00002000
000021    15   HASH-KTOID        REDEFINES HASH-LEVEL2.
         00002100
000022    20   HASH-K001-NL      PIC X(04).             00002200
000023    20   HASH-K001-AGENTC  PIC X(02).
         00002300
000024    20   HASH-K001-KTOST   PIC X(08).
         00002400
000025    20   HASH-K001-KTOZU   PIC X(02).
         00002500
000026    20   HASH-K001-KTOLNR  PIC 9(4).
         00002600
000027    15   HASH-DPID         REDEFINES HASH-LEVEL2.
         00002700
000028    20   DPID              PIC X(16).
         00002800
000029    20   FILLER            PIC X(04).
         00002900
000030    15   HASH-SAFEID       REDEFINES HASH-LEVEL2.
         00003000
000031    20   SAFEID            PIC X(14).
         00003100
000032    20   FILLER            PIC X(06).
         00003200
000033    15   HASH-SVKEY        REDEFINES HASH-LEVEL2.
         00003300
000034    20   SVKEY             PIC X(17).
         00003400
000035    20   FILLER            PIC X(03).
         00003500
000036    15   HASH-D101-ALFKEY  REDEFINES HASH-LEVEL2.
         00003600
000037    20   ALFKEY            PIC X(20).
         00003700
000038    15   HASH-ADRLNR       REDEFINES HASH-LEVEL2.
         00003800
000039    20   ADRLNR            PIC 9(4).
         00003900
000040    20   FILLER            PIC X(16).
         00004000
000041*  ** Level 2 key                                 00004100
000042    15   HASH-LEVEL3       PIC X(40).
         00004201
000043*  ** Level 3 key redefines
         00004300
```

-continued

```
000051  15  HASH-K004        REDEFINES HASH-LEVEL3.
        00005100
000052  20    HASH-K004-OBJINSC   PIC 9(01).
        00005200
000053  20    HASH-K004-NL        PIC X(04).                    00005300
000054  20    HASH-K004-AGENTC    PIC X(02).
        00005400
000055  20    HASH-K004-KTOST     PIC X(08).
        00005500
000056  20    HASH-K004-KTOZU     PIC X(02).
        00005600
000057  20    HASH-K004-KTOLNR    PIC 9(4).
        00005700
000058  20    FILLER              PIC X(19).
        00005801
000059  15  HASH-K005060716   REDEFINES HASH-LEVEL3.
        00005900
000060  20    HASH-K005-INSCHL    PIC X(08).
        00006000
000061  20    FILLER              PIC X(32).
        00006101
000062  15  HASH-K01013      REDEFINES HASH-LEVEL3.
        00006200
000063  20    HASH-K010-DATGBI    PIC 9(08).
        00006300
000064  20    FILLER              PIC X(32).
        00006401
000065  15  HASH-K011        REDEFINES HASH-LEVEL3.
        00006500
000066  20    HASH-K011-VINSCHL   PIC X(09).
        00006600
000067  20    FILLER              PIC X(31).
        00006701
000072  15  HASH-F112-116    REDEFINES HASH-LEVEL3.
        00007200
000073  20    HASH-F112-INSCHL    PIC X(08).
        00007300
000074  20    FILLER              PIC X(32).
        00007401
000075  15  HASH-F117        REDEFINES HASH-LEVEL3.
        00007500
000076  20    HASH-F117-VINSCHL   PIC X(09).
        00007600
000077  20    FILLER              PIC X(31).
        00007701
000078  15  HASH-F213-216    REDEFINES HASH-LEVEL3.
        00007800
000079  20    HASH-F213-INSCHL    PIC X(08).
        00007900
000080  20    FILLER              PIC X(32).
        00008001
000081  15  HASH-F217        REDEFINES HASH-LEVEL3.
        00008100
000082  20    HASH-F217-VINSCHL   PIC X(09).
        00008200
000083  20    FILLER              PIC X(31).
        00008301
000084  15  HASH-F219        REDEFINES HASH-LEVEL3.
        00008400
000085  20    HASH-F219-DATUM-RST PIC 9(08).
        00008500
000086  20    FILLER              PIC X(32).
        00008601
000087  15  HASH-D101        REDEFINES HASH-LEVEL3.
        00008700
000088  20    HASH-D101-ADRLNR-KD PIC 9(04).
        00008800
000089  20    FILLER              PIC X(36).
        00008901
000090  15  HASH-D111        REDEFINES HASH-LEVEL3.
        00009000
000091  20    HASH-D111-ADRLNR-KD PIC 9(04).
        00009104
000092  20    HASH-D111-ALFKEY    PIC X(20).
        00009204
000094  20    FILLER              PIC X(16).
        00009401
000099  15  HASH-D322        REDEFINES HASH-LEVEL3.
        00009900
```

-continued

```
000100   20    HASH-D322-PUBC      PIC 9(03).          00010000
000101   20    HASH-D322-SPRACHP   PIC 9(02).
         00010100
000102   20    FILLER              PIC X(35).
         00010201
000103   15    HASH-D211           REDEFINES HASH-LEVEL3.
         00010300
000104   20    HASH-D211-VERART    PIC 9(02).
         00010400
000105   20    HASH-D211-KDIDS     PIC X(12).
         00010500
000106   20    FILLER              PIC X(26).
         00010601
000107   15    HASH-D212           REDEFINES HASH-LEVEL3.
         00010700
000108   20    HASH-D212-OBJZUG    PIC 9(01).
         00010800
000109       20 HASH-D212-OBJTYP   PIC X(01).          00010900
000110   20    HASH-D212-OBJID     PIC X(20).
         00011000
000111   20    HASH-D212-VERART    PIC 9(02).
         00011100
000112   20    FILLER              PIC X(16).
         00011201
000113   15    HASH-D214-217       REDEFINES HASH-LEVEL3.
         00011300
000114   20    HASH-D214-INSCHL    PIC X(08).
         00011400
000115   20    FILLER              PIC X(32).
         00011501
000116   15    HASH-TIMESTAMP      REDEFINES HASH-LEVEL3.
         00011600
000117   20    HASH-TIMESTAMP      PIC X(20).
         00011700
000118   20    FILLER              PIC X(20).
         00011801
000119*  ** Filler for later extensions
         00011900
000120   15    FILLER-TSD          PIC X(10).
         00012002
000121*  ** Hash sum
         00012100
000130   10    HASH-SUM            PIC 9(16).
         00013000
```

The conversion file has the following structure:

```
000001*  **
         00000100
000002*  ** Relocate record for DB1 - DB2 reconciliation   00000200
000003*  **
         00000300
000004*  ** References to change comments
         00000400
000005*  **
         00000500
000006*  ** Release ODP/CIF EFP 03/2003
         00000600
000007*  **
         00000700
000008   05   RELOCATE-RECORD-DATA.
         00000800
000009*  ** Record type                                    00000900
000010   10   RECON-RECTYP         PIC X(04).              00001000
000011*  ** Level 1 - 5 key                                00001100
000012   10   RECON-KEY.
         00001200
000013   15   RECON-NL             PIC X(4).               00001300
000014   15   RECON-KDST           PIC X(8).
         00001400
000015   15   RECON-OBJID          PIC X(20).
         00001500
000016   15   RECON-LEVEL3         PIC X(40).
         00001600
```

The comparison file uses the same data structures as are used for other synchronisation. The header part of the comparison file is explained in detail below:

| Name | Content | Length |
|---|---|---|
| COEX-MUTPRG | program name of change program | PIC X(08). |
| COEX-AGENTC | agency code | PIC X(02). |
| COEX-APCDE | application code | PIC X(02). |
| COEX-NL | processing branch | PIC X(04). |
| COEX-UFCC-E | program function code | PIC X(03). |

-continued

| Name | Content | Length |
|---|---|---|
| COEX-UPTYP | Update type<br>S = STORE<br>M = MODIFY<br>D = DELETE (ERASE) | PIC X(01). |
| COEX-USERID | USERID of responsible person | PIC X(06). |
| COEX-PAKET-TIME-STAMP | date and time (YYYYMMDDhhmmssuuuuuu) of packet | PIC X(20). |
| COEX-REC-TIME-STAMP | date and time (YYYYMMDDhhmmssuuuuuu) of change | PIC X(20). |
| COEX-NL-KD | branch | PIC X(04). |
| COEX-KDST | customer code number | PIC X(08). |
| COEX-OBJID | object identification/DB1 key fields | PIC X(20). |
| COEX-RECTYP | record type (record type from database 1 or TERM, TERM records do not include data part) | PIC X(04). |
| COEX-REC-SEQUENZ | record sequence number (within packet, in case of TERM = highest sequence number per packet) | PIC 9(08). |
| COEX-ORIGIN | origin of record<br>0 = initial load (BC)<br>1 = redelivery (DB1)<br>2 = synchronisation<br>3 = reconciliation (DB2)<br>5 = online sister (DB2)<br>6 = reconciliation (BC) | PIC X(1) |
| COEX-REQUEST-TYPE | O = online processing<br>B = batch processing | PIC X(1) |
| COEX-RESYNC-ID | primary key from TAPCPACKAGE or TAPCDATA for redelivery | PIC X(32) |
| COEX-RESYNC-STATUS | contains return code of database 1 redelivery function | PIC X(2) |
| COEX-LEVEL3-KEY | database 1 key fields | PIC X(40) |
| COEX-RESERVED | Reserved | PIC X(6) |
| COEX-DATA | record, old and new | PIC X(10600). |

| Table name | Insert | change | Delete |
|---|---|---|---|
| Data container | business service error processing | business service error processing | reorg job |
| Error log file | business service general services | business service general services | reorg job |
| Unload files DB2 | unload jobs DB2 | none | unload jobs DB2 |
| Hash file | hash program DB1<br>hash program DB2 | none | network job, before start of reconciliation run |
| Conversion file | compare program | none | network job, before start of reconciliation run |
| Comparison file | selection program DB1<br>selection program DB2 | none | network job, before start of reconciliation run |
| Redelivery file | redelivery function error processing | none | file is overwritten or deleted after transfer |
| Q1 database | redelivery module | none | monitor |

The coexistence controller program defines the programs or program components which are called up for a specified record type. The coexistence controller program is required to load the data to be corrected from the first database into the context of the second database.

In the case of successful redeliveries, the coexistence controller program sets the errored entries in the data container to "done".

The error messages and the errored data can be displayed (sorted if required). Functions are provided to initiate the redelivery services.

In the data container, the errors which are derived from the reconciliation of the second database can be distinguished from those which are derived from the synchronisation between the two databases. Additionally, functions for display, correction and redelivery or retry of the data are provided.

Through the function according to the invention, the quantities and error types are reduced the longer the systems of the two database environments are operated in parallel. Reconciliation can be done after the end of processing (day, week or similar) and according to record type. It is also possible to check only the records which are already required (interrogated) on the side of the second database. The records which are not yet used can be checked only once per month, for instance.

Reconciliation discovers inequalities between the systems of the two databases and corrects them. In this way, in the first place errors which have not already been discovered by synchronisation are detected. These can be:

- non-encapsulation of a batch/online program on the system of the first database
- messages and/or files lost on the transport path
- program errors in the environment of the second database system
- restoration on one of the two systems
- message records which cannot be applied in the context of the second database It is assumed that most errors can be corrected by the redelivery function. Alternatively, it is also possible through a further initial load or partial initial load (mass update) to reload the second database.

From the database entries to be compared and their attributes, in a first step the hash values are determined and compared with each other. If they are different, in a second step the original data items are compared with each other. For this purpose, first the hash values, and in a second step the original data items if required, are sent by the encapsulation module to the second database and compared there.

| DB1 record | Description |
|---|---|
| D101 | Alfasearch (area) |
| D111 | secondary Alfasearch |
| D201 | customer |
| D211 | customer contact |
| D212 | customer objects |
| D214 | notification |
| D215 | blocking |
| D216 | instruction |
| D217 | Avor |
| D219 | score values |
| D220 | application |
| D222 | customer master data for scoring |
| D225 | customer master data for application scoring for entrepreneur line |
| D226 | movement data for scoring for entrepreneur line |
| D311 | customer address |
| D321 | return address |
| D322 | publication |
| D535 | customer master for messageless customers |
| F101 | securities account master |
| F111 | proof of availability |
| F112 | triggering |
| F113 | blocking |
| F114 | instructions |
| F115 | notification |
| F116 | indication |
| F117 | dispatch instruction |
| F201 | save |
| F213 | blocking |
| F214 | instructions |
| F216 | indication |
| F217 | dispatch instruction |
| F219 | open invoices safe |
| F230 | safe administration |
| K001 | account master external accounts |
| K002 | proof of availability |
| K004 | subsidiary account contact |
| K005 | individual triggering instructions |
| K006 | blocking instructions |
| K007 | instructions |
| K010 | individual terms and conditions |
| K011 | dispatch instructions |
| K012 | basis grading external account area |
| K013 | terms and conditions for market interest rate method |
| K016 | notification |

The invention claimed is:

1. A network system for synchronizing a first database and a second database comprising:
a first server comprising:
a processing unit configured to access memory and execute computer executable instructions;
an encapsulation module stored in memory comprising computer executable instruction configured to:
accept a work unit from at least one application workstation, the work unit comprising a request to at least one of generate, change or delete contents of the first database;
update the first database based on the accepted work unit; and
select between database-entry-oriented synchronization and functional synchronization,
wherein in database-entry-oriented synchronization, the encapsulation module is configured to transmit changed entries at the first database to a coexistence controller, and
wherein in functional synchronization the encapsulation module is configured to provide a characterization of the update at the first database to a second server or provide the work unit to the second server;
the second server comprising:
the coexistence controller configured to:
in response to receipt of the changed entries, enter entries in the second database corresponding to the changed entries and execute an adaption program containing adaptation rules; and
invoke at least one sister transaction in response to receipt of the characterization or the work unit, each sister transaction comprises computer executable instructions that when executed are configured to operate in a manner analogously at the second database as a corresponding transaction at the first database to synchronise the second database with the first database, the first and second databases being different database types.

2. The network system according to claim 1, wherein functions, services and data which exist at the first database are made available at the second database by the sister transactions that employ similar source programs that execute the functions and services that exist at the first database such that interfaces of at least one application software program of the at least one application workstation remains substantially unchanged.

3. The network system according to claim 1, wherein each sister transaction has one or more software program modules stored in memory, which contain processing logic instructions and access the second database via primitives.

4. The network system according to claim 3, wherein interfaces of each sister transaction correspond to an original transaction at the first database.

5. The network system according to claim 1, wherein the coexistence controller of the second server invokes the at least one sister transaction, during a functional synchronization wherein the work unit is not revalidated at the second server.

6. The network system according to claim 1, wherein the encapsulation module is further configured to update the first database in real time to synchronise changed entries of the first database into the second database, wherein the changed entries at the first database are sent to the coexistence controller of the second server, the coexistence controller being further configured to track coexistence element programs and corresponding application program elements.

7. The network system according to claim 1, wherein the at least one sister transaction is configured to write to the second database by executing corresponding application program elements.

8. The network system according to claim 6, wherein the coexistence controller of the second server is further configured to prioritise application software programs to be ported in the case of synchronisation in the direction from the first to the second database, such that an accepted work unit of a first type triggers the selection of the database-entry-oriented synchronisation; and an accepted work unit of a second type triggers the selection of the functional synchronisation.

9. The network system according to claim 1, wherein the encapsulation module is further configured to decompose the accepted work unit into one or more messages that each correspond to an entry at the first database, the messages are entered in the first database, and the messages are sent to the coexistence controller.

10. The network system according to claim 1,
wherein the coexistence controller is further configured to:
execute coexistence utility programs for the entering of entries in the second database; and
execute as the adaption program at least one of coexistence elements and coexistence utility programs of application software programs, the coexistence elements and the coexistences utility programs each contain at least one of adaptation rules from the first to the second database and adaptation rules to application software programs at the second database.

11. The network system according to claim 10,
wherein the coexistence controller is further configured to forward the work unit to at least one of the sister transactions based on a message identifier.

12. The network system according to claim 1, the second server further comprising:
a second server processing unit that accesses memory and executes computer executable instructions;
a sister encapsulation module comprising computer executable instructions stored in memory that when executed are configured to:
modify the second database synchronously using database macros, and
send the same database entries to the coexistence controller as are sent to at least one of the coexistence elements and the coexistence utility programs of application software programs.

13. The network system according to claim 11, wherein the encapsulation module is further configured to decompose the accepted work unit into one or more messages that each correspond to an entry at the first database, the messages are entered in the first database, and the messages are sent to the coexistence controller in the database-entry-oriented synchronisation.

14. The network system according to claim 13, wherein the encapsulation module program is further configured to test whether it is more efficient, particularly regarding transmission duration and transmission quantity and/or processing cost in the context of the second database, either to send changed entries resulting from the application of the work unit to the first database as individual functions to the second server, or to send the changed entries resulting from the application of the work unit to the first database as individual messages to the coexistence controller.

15. A method for synchronizing a first database and a second database comprising:
accepting, at an encapsulation module of a first server, a work unit from at least one application workstation, the work unit comprising a request to at least one of generate, change or delete contents of the first database;
updating the first database based on the accepted work unit;
selecting between database-entry-oriented synchronization and functional synchronization,
wherein in database-entry-oriented synchronization, the encapsulation module is configured to transmit changed entries at the first database to a coexistence controller, and
providing, by the encapsulation module a characterization of the updating at the first database to a second server or providing the work unit to the second server in functional synchronization;
entering of entries in the second database corresponding to changed entries and executing an adaption program containing adaption rules in response to receipt of the changed entries at the second server; and
invoking at least one sister transaction in response to receipt of the characterization or the work unit by a coexistence controller of the second server, the sister transaction comprising computer executable instructions that when executed are configured to operate in a manner analogously at the second database as a corresponding transaction at the first database to synchronise the second database with the first database, the first and second databases being different database types.

16. The method according claim 15 further comprising: decomposing the accepted work unit into one or more messages, each message corresponding to an entry at the first database;
entering the messages in the first database; and
sending the messages to the coexistence controller.

17. The method according to claim 15, further comprising providing a software program component at the first server that is stored in memory such that in response to the work unit from the at least one application workstation, a sister transaction can be invoked by the coexistence controller at the second database such that from the point of view of the at the least one application workstation, the sister transaction at the second database performs analogously to a corresponding transaction at the first database.

18. The method according to claim 15 further comprising providing functions, services and data at the first database and the second database, wherein the encapsulation module of the first server and the coexistence controller of the second server execute similar source programs to perform the functions and services at the first database and the second database, such that, interfaces at one or more application software programs are substantially unchanged.

19. The method according to claim 18, wherein each sister transaction has one or more software program modules, which contain processing logic instructions and are configured to access the second database via primitives.

20. The method according to claim 19, wherein interfaces of each sister transaction at the second server corresponds to an original transaction at the first database.

21. The method according to claim 15,
wherein the updating of the first database is performed in real time to synchronise changed entries of the first database with the second database; and
tracking coexistence element programs and corresponding application program elements at the coexistence controller.

22. The method according to claim 15 further comprising; triggering the selection of the database-entry-oriented synchronisation in response to accepting a work unit of a first type;

triggering the selection of the functional synchronisation in response to accepting a work unit of a second type.

23. The method according to claim 15, further comprising:

executing by the coexistence controller coexistence utility programs of a coexistence element that enter the changed entries at the first database at the second database; and executing, as the adaptation program at least one coexistence elements and coexistence utility programs of application software programs, which contain at least one of adaptation rules from the first to the second database and adaptation rules for the application software programs in the second database.

24. The method according to claim 15 further comprising:

accepting a work unit from at least one application workstation at a sister encapsulation module of the second server, the work unit comprising a request to at least one of generate, change or delete contents of the first database;

modifying the second database synchronously using database macros; and sending the same database entries from the sister encapsulation module to the coexistence controller as are sent to coexistence elements and/or coexistence utility programs of application software programs.

25. The method according to claim 15, further comprising testing, by the encapsulation module of the first server whether it is more efficient, particularly regarding transmission duration and transmission quantity and/or processing cost in the context of the second database, either to send changed entries resulting from the application of the work unit to the first database as individual functions to the coexistence controller, or to send the changed entries resulting from the application of the work unit to the first database as individual messages to the second server, wherein each of the individual messages coffesponds to a database entry at the first database.

26. A computer readable medium having computer executable instructions for performing the method according to claim 15.

27. The network system of claim 1, wherein the first database is a hierarchical database and the second database is relational database or an object-oriented database.

28. The method claim 15, wherein the first database is a hierarchical database and the second database is relational database or an object-oriented database.

* * * * *